(12) United States Patent
Achtermann et al.

(10) Patent No.: US 10,311,086 B2
(45) Date of Patent: Jun. 4, 2019

(54) CROSS-DOMAIN CLUSTERABILITY EVALUATION FOR CROSS-GUIDED DATA CLUSTERING BASED ON ALIGNMENT BETWEEN DATA DOMAINS

(71) Applicant: International Business Machines Corporation, Armonk, NY (US)

(72) Inventors: Jeffrey M. Achtermann, Austin, TX (US); Indrajit Bhattacharya, New Delhi (IN); Kevin W. English, Fairfield, CT (US); Shantanu R. Godbole, New Delhi (IN); Sachindra Joshi, New Delhi (IN); Ashwin Srinivasan, New Delhi (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 15/070,495

(22) Filed: Mar. 15, 2016

(65) Prior Publication Data
US 2016/0196328 A1    Jul. 7, 2016

Related U.S. Application Data

(63) Continuation of application No. 14/147,691, filed on Jan. 6, 2014, now Pat. No. 9,336,296, which is a (Continued)

(51) Int. Cl.
*G06F 17/30* (2006.01)
*G06F 16/28* (2019.01)
(Continued)

(52) U.S. Cl.
CPC .......... *G06F 16/285* (2019.01); *G06F 16/355* (2019.01); *G06F 16/951* (2019.01)

(58) Field of Classification Search
CPC .................................................... G06F 16/285
(Continued)

(56) References Cited

U.S. PATENT DOCUMENTS 6,523,026 B1 * 2/2003 Gillis ............... G06F 17/30637
8,229,929 B2   7/2012 Achtermann et al.
(Continued)

OTHER PUBLICATIONS

Dhillon, I. et al.; Information-theoretic co-clustering; ACM SIGKDD International Conference on Knowledge Discovery and Data Mining; 2003; 10 pages.
(Continued)

*Primary Examiner* — Mahesh H Dwivedi
*Assistant Examiner* — Johnese T Johnson
(74) *Attorney, Agent, or Firm* — Schmeiser, Olsen & Watts, LLP; Mark Vallone

(57) ABSTRACT

A method and system. Target clusterability is calculated as an average of a respective clusterability of at least one target data item comprised by a target domain. Target-side matchability is calculated as an average of a respective matchability of each target centroid of the target domain to source centroids of a source domain, wherein the source domain comprises at least one source data item. Source-side matchability is calculated as an average of a respective matchability of each source centroid of said source centroids to the target centroids. Source-target pair matchability is calculated as an average of the target-side matchability and the source-side matchability. Cross-domain clusterability between the target domain and the source domain is calculated as a linear combination of the calculated target clusterability and the calculated source-target pair matchability. The cross-domain clusterability is transferred to a device.

14 Claims, 13 Drawing Sheets

Related U.S. Application Data continuation of application No. 13/432,425, filed on Mar. 28, 2012, now Pat. No. 8,639,696, which is a continuation of application No. 12/683,095, filed on Jan. 6, 2010, now Pat. No. 8,229,929.

(51) Int. Cl.
   *G06F 16/35* (2019.01)
   *G06F 16/951* (2019.01)

(58) Field of Classification Search
   USPC .......................................................... 707/737
   See application file for complete search history.

(56) References Cited

U.S. PATENT DOCUMENTS

| | | |
|---|---|---|
| 8,639,696 B2 | 1/2014 | Achtermann et al. |
| 8,661,039 B2 | 2/2014 | Achtermann et al. |
| 2004/0030551 A1 | 2/2004 | Marcu et al. |
| 2007/0083357 A1 | 4/2007 | Moore et al. |
| 2008/0249764 A1 | 10/2008 | Huang et al. |
| 2009/0083023 A1 | 3/2009 | Foster et al. |
| 2009/0119095 A1 | 5/2009 | Beggelman et al. |
| 2010/0121793 A1 | 5/2010 | Fujimaki et al. |
| 2011/0166850 A1 | 7/2011 | Achtermann et al. |
| 2011/0167064 A1 | 7/2011 | Achtermann et al. |
| 2012/0191713 A1 | 7/2012 | Achtermann et al. |
| 2012/0197892 A1 | 8/2012 | Achtermann et al. |
| 2014/0122492 A1 | 5/2014 | Achtermann et al. |

OTHER PUBLICATIONS

Klein, D. et al.; From instance-level constraints to space-level constraints: Making the most of prior knowledge in data clustering; International Conference on Machine Learning; 2002; 8 pages.

Lewis, D. D. et al.; Rcv1: A new benchmark collection for text categorization research; Journal of Machine Learning Research; 2004; pp. 261-397.

Raina, R. et al.; Selftaught-learning: transfer learning from unlabeled data; International Conference on machine Learning; 2007; 8 pages.

Slonim, N. et al.; Document clustering using word clusters via the information bottleneck methco; The Annual International ACM SIGIR Conference; 2000; 8 pages.

Wagstaff, K. et al.; Constrained k-means clustering with background knowledge; International Conference on Machine Learning; 2001; pp. 577-584.

Dai et al.; Self-taught clustering; International Conference on Machine Learning; 2008; 8 pages.

Dai et al.; Transferring naive byes classifiers for text classification; Conference of the American Association for Artiticial Intelligence (AAAI); 2007; 6 pages.

Wu, P., et al.; Improvingsvm accuracy by training on auxiliary data sources; International Conference on Machine Learning; 2004; 8 pages.

Kuhn, H.W.; The Hungarian method for the assignment problem; Naval Research Logistics Quarterly; vol. 2; 1955; pp. 83-97.

Thrun et al.; Learning to learn; Kluwer Academic Publishers; ISBN 0-7923-8047-9; 1998; pp. 3-17.

Dai et al.; Co-clustering Based Classification for Out-of-Domain Documents; International Conference on Knowledge Discovery and Data Mining, Proceedings of the 13th ACM SIGKDD International Conference on Knowledge Discovery and Data Mining; 2007; pp. 210-219.

Pan et al.; Transfer Learning Via Dimensionality Reduction; In the Proceedings of the 23rd AAAI Conference on Artificial Intelligence (AAAI 08); Chicago, Illinois, USA; Jul. 2008; pp. 677-682.

Shi et al.; Actively Transfer Domain Knowledge; Lecture Notices in Artificial Intelligence; vol. 5212; Proceedings of the European Conference on Machine Learning and Knowledge Discovery in Databases—Part II; 2008; 16 pages.

Torrey et al.; Transfer Learning; Handbook of Research on Machine Learning Applications; Publisher: IGI Global; 2009; 22 pages.

Wang et al.; Using Wikipedia for Co-Clustering Based Cross-Domain Text Classification; ICDM, Proceedings of the 2008 Eighth IEEE International Conference on Data Mining; 2008; pp. 1085-1090.

Zhang et al.; Iterative Reinforcement Cross-Domain Text Classification; Advanced Data Mining Applications (ADMA); 2008; pp. 282-292.

Basu et al.; Semi-supervised clustering by seeding; International Conference on Machine Learning; 2002.

Baxter, J.; A model of inductive bias learning; Journal of Artificial Intelligence Research; vol. 12; 2000; pp. 149-198.

Berkhin, P.; Survey of clustering data mining techniques; Technical Report; Accrue Software; 2002.

Bhattacharya, I., et al.; Collective entity resolution in relational data; ACM Transactions onKnowledge Discovery for Data; vol. 1, No. 1; Mar. 2007; pp. 1-36.

Bilenko, M. et al.; Adaptive duplicate detection using learnable string similarity measures; ACM SIGKDD International Conference on Knowledge Discovery and Data Mining; 2003.

Blitzer, J. et al.; Biographies, Bollywood, boom-boxes and blenders: Domain adaptation for sentiment classification; Association for Computational Linguistics; 2007.

Davidov, D. et al.; Parameterized generation of labeled datasets for text categorization based on a hierarchical directory; The Annual International ACM SIGIR Conference; 2004.

Office Action (dated Dec. 8, 2011) for U.S. Appl. No. 12/683,095, filed Jan. 6, 2010; Confirmation No. 2403.

Amendment filed Mar. 7, 2012 for U.S. Appl. No. 12/683,095, filed Jan. 6, 2010; Confirmation No. 2403.

Notice of Allowance (dated Mar. 19, 2012) for U.S. Appl. No. 12/683,095, filed Jan. 6, 2010; Confirmation No. 2403.

Office Action (dated Feb. 5, 2013) for U.S. Appl. No. 12/652,987, filed Jan. 6, 2010; Confirmation No. 2212.

Office Action (dated Jan. 11, 2013) for U.S. Appl. No. 13/437,287, filed Apr. 2, 2012; Confirmation No. 5675.

Office Action Response filed Apr. 5, 2013 for U.S. Appl. No. 13/437,287, filed Apr. 2, 2012; Confirmation No. 5676.

Office Action (dated Dec. 7, 2012) for U.S. Appl. No. 13/432,425, filed Mar. 28, 2012; Confirmation No. 5206.

Office Action Response filed Mar. 4, 2013 for U.S. Appl. No. 13/432,425, filed Mar. 28, 2012; Confirmation No. 5206.

Notice of Allowance (dated Jun. 18, 2013) for U.S. Appl. No. 13/432,425, filed Mar. 28, 2012; Confirmation No. 5206.

RCE filed Aug. 1, 2013 for U.S. Appl. No. 13/432,425, filed Mar. 28, 2012; Confirmation No. 5206.

Notice of Allowance (dated Sep. 12, 2013) for U.S. Appl. No. 13/432,425, filed Mar. 28, 2012; Confirmation No. 5206.

Office Action (dated Jul. 31, 2015) for U.S. Appl. No. 14/147,691, filed Jan. 6, 2014, Conf. No. 4862.

Amendment (dated Oct. 30, 2015) for U.S. Appl. No. 14/147,691, filed Jan. 6, 2014, Conf. No. 4862.

Notice of Allowance (dated Feb. 12, 2016) for U.S. Appl. No. 14/147,691, filed Jan. 6, 2014, Conf. No. 4862.

Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <https://www.uspto.gov/about-us/news-updates/remarks-director-iancu-intellectual-property-owners-46th-annual-meeting>, 7 pages.

* cited by examiner

CROSS-DOMAIN CLUSTERABILITY EVALUATION FOR CROSS-GUIDED DATA CLUSTERING BASED ON ALIGNMENT BETWEEN DATA DOMAINS

This application is a continuation application claiming priority to Ser. No. 14/147,691, filed Jan. 6, 2014, which is a continuation of Ser. No. 13/432,425, filed Mar. 28, 2012, U.S. Pat. No. 8,639,696, issued Jan. 28, 2014, which is a continuation of Ser. No. 12/683,095, filed Jan. 6, 2010, U.S. Pat. No. 8,229,929, issued Jul. 24, 2012.

BACKGROUND

The present invention discloses a computer program product for data clustering of a target domain that is guided by relevant data clustering of a source domain, and for evaluating cross-domain clusterability of target domain data set and source domain data set. Conventional k-means data clustering generates clusters based only on intrinsic nature of data in the target domain. Due to lack of guidance in clustering data in the target domain, conventional k-means data clustering often results in clusters that are not useful to human users in devising text analytics solutions.

BRIEF SUMMARY

According to one embodiment of the present invention, a computer program product comprises a computer readable memory unit that embodies a computer readable program code. The computer readable program code contains instructions that, when run by a processor of a computer system, implement for evaluating cross-domain clusterability upon a target domain and a source domain comprises: a processor of a computer system receiving the source domain and the target domain, wherein the source domain comprises at least one source data item and the target domain comprises at least one target data item; said processor calculating target clusterability as an average of a respective clusterability of said at least one target data item such that the target clusterability quantifies how clusterable the target domain is, wherein the respective clusterability of a target data item of said at least one target data item quantifies how unambiguously the target data item can be assigned to a respective true target centroid associated with the target data item; said processor calculating target-side matchability as an average of a respective matchability of each target centroid of the target domain to source centroids of the source domain such that the target-side matchability quantifies how well target centroids of the target domain are aligned with the source centroids; said processor calculating source-side matchability as an average of a respective matchability of each source centroid of said source centroids to the target centroids such that the source-side matchability quantifies how well the source centroids are aligned with the target centroids; said processor calculating source-target pair matchability as an average of the target-side matchability and the source-side matchability; said processor calculating cross-domain clusterability between the target domain and the source domain as a linear combination of the calculated target clusterability and the calculated source-target pair matchability by use of a trade-off parameter that indicates relative contribution of the target clusterability and the source-target pair matchability to the cross-domain clusterability; and said processor transferring the calculated cross-domain clusterability to a device selected from an output device of the computer system, a storage device of the computer system, a remote computer system coupled to the computer system, and a combination thereof.

DETAILED DESCRIPTION

Figure 1:
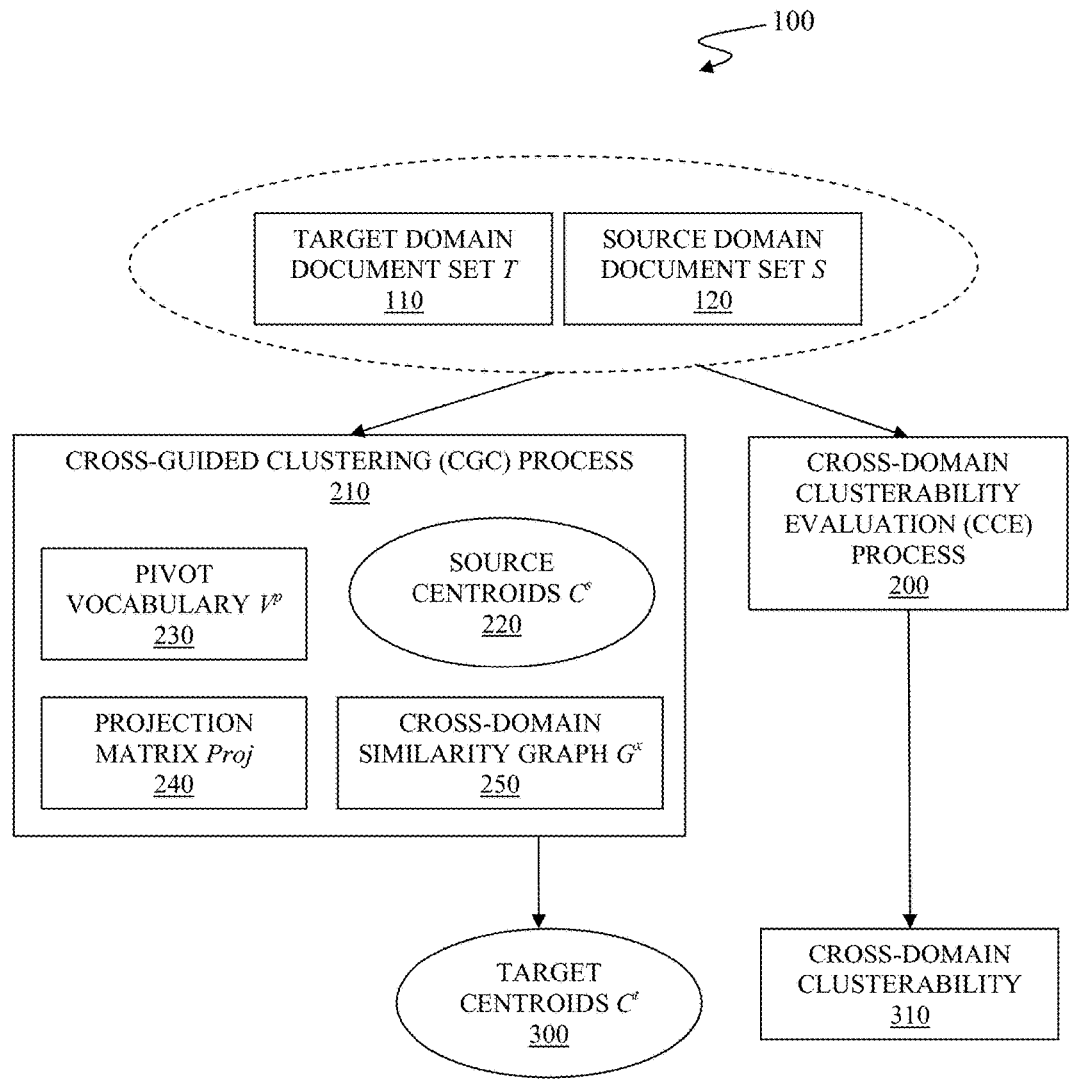
FIG. 1 illustrates a system for cross-guided clustering based on alignment between data domains, in accordance with embodiments of the present invention.

FIG. 1 illustrates a system 100 for cross-domain clusterability evaluation of cross-guided clustering based on alignment between data domains, in accordance with embodiments of the present invention.

The system 100 comprises a target domain item set T 110, a source domain item set S 120, and a cross-domain clusterability evaluation (CCE) process 200.

The target domain data item set or simply the target domain T 110 comprises a first set of data items $\{t_1, t_2, \ldots, t_n\}$ which is referred to as target data items. A target vocabulary $V^t$ refers to a first group of attributes which make up the target data items $\{t_1, t_2, \ldots, t_n\}$ of the target domain T 110. The target domain T 110 is a first input to the CCE process 200. In one embodiment of the present invention, the target data items are documents, of which attributes are words. In this specification, the terms "data item" and "document" are used interchangeably. Similarly, the terms "attribute" and "word" are used interchangeably throughout this specification.

The source domain data item set or simply the source domain S 120 comprises a second set of data items {$S_1$, $S_2$, ..., $S_m$} which is referred to as source data items. A source vocabulary $V^s$ refers to a second group of words in the source data items {$S_1$, $S_2$, ..., $S_m$} of the source domain S 120. The source domain S 120 is a second input to the CCE process 200.

The cross-domain clusterability evaluation (CCE) process 200 calculates cross-domain clusterability 310 that represents how effectively the cross-guided clustering can be performed upon the target domain T 110 and the source domain S 120. See descriptions of FIG. 4A infra for details of cross-domain clusterability evaluation. The cross-domain clusterability evaluation (CCE) may be performed in combination with cross-guided clustering between the target domain T 110 and the source domain S 120.

Figure 3:
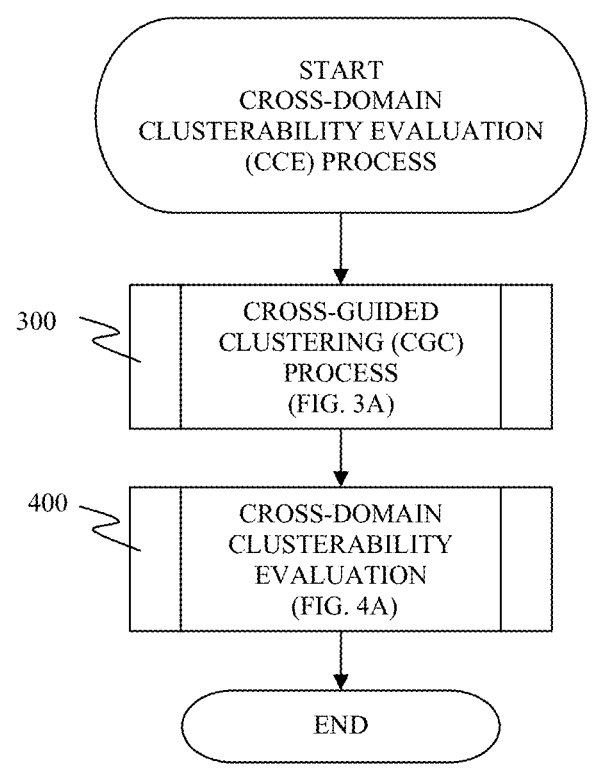
FIG. 3 is a flowchart depicting a method for cross-guided clustering based on alignment between data domains and for evaluating cross-domain clusterability of the data domains, in accordance with the embodiments of the present invention.

In one embodiment shown in FIG. 3 infra, the CCE process 200 is performed in combination with cross-guided clustering by use of a cross-guided clustering (CGC) process 210. See descriptions of FIG. 3A infra for details of the CGC process 210. in another embodiment, the cross-domain clusterability evaluation (CCE) 200 is performed prior to the CGC process 210.

The cross-guided clustering (CGC) process 210 receives the source domain data items S 120 and the target domain data items T 110 as inputs and generates k number of target centroids $C^t$ 300 as an output. While performing cross-guided clustering to generate the target centroids $C^t$ 300, the CGC process 210 generates intermediary data structures comprising source centroids $C^s$ 220, a pivot vocabulary 230, a projection matrix 240, and a cross-domain similarity graph $G^x$ 250. The CGC process 210 automatically transfers a relevant supervision over the source domain S 120 to clustering of the target domain T 110. The relevant supervised partitioning of the source domain S 120 is represented by the source centroids $C^s$ 220. The cross-guided clustering of the CGC process 210 generates k number of target centroids $C^t$ 300 that is more meaningful for human users than in conventional data clustering because the target centroids $C^t$ 300 are aligned with the source centroids $C^s$ 220 as much as possible rather than being clustered based solely on intrinsic clustering goodness on the target domain T 110 as in conventional data clustering. The CGC process 210 significantly improves clustering accuracy of conventional k-means algorithm by aligning the target centroids $C^t$ 300 with source centroids $C^s$ 220, which creates and utilizes the pivot vocabulary 230, the projection matrix 240, and the cross-domain similarity graph $G^x$ 250. Because the target centroids $C^t$ 300 are aligned with the source centroids $C^s$ 220, the CGC process 210 automates text analytics in predictive modeling and data classification and reduces cost and time for human involvement that are required in conventional k-means data clustering.

The source centroids $C^s$ 220 comprise a respective source centroid {$\overline{C}_j^s$} that represents each source cluster of k' source clusters {$C_1^s$, $C_2^s$, ..., $C_{k'}^s$} that partitions the source domain S 120. In this specification, the term "cluster" means a disjoint subset of the items in a domain, which is used interchangeably with the term "partition." The respective source centroid {$\overline{C}_j^s$} is a source data item that represents all source data items of the respective source cluster $C_j^s$. In this specification, the term "centroid" means a center element of a cluster that determines membership of an object element to the cluster according to a distance between the centroid and the object element. Each source data item of the source domain S 120 is assigned to a source centroid that is the nearest to the respective source data item of all the source centroids $C^s$ 220. Source data items are also referred to as being assigned to a source cluster that corresponds to the source centroid. See descriptions of step 320 in FIG. 3A, infra, for details of creating the source centroids $C^s$ 220.

The pivot vocabulary 230 addresses issues caused by words in the target domain T 110 and the source domain S 120 when the words are lexically identical but not semantically identical. The pivot vocabulary 230, denoted as $V^p$, comprises pivot words from the source vocabulary $V^s$ and the target vocabulary that are lexically identical. Words in the source vocabulary $V^s$ and the target vocabulary $V^t$ except the pivot vocabulary $V^p$ 230 are referred to as non-pivot words. See descriptions of step 310 of FIG. 3A, infra, for details of establishing the pivot vocabulary 230.

The projection matrix 240 addresses issues caused by words that are not shared in the source vocabulary $V^s$ and the target vocabulary $V^t$ but are semantically related. As in the cases of synonyms "agent" and "representative," the words do not count as similar in conventional clustering. The CGC process 210 employs a projection approach that distributes weights of non-pivot words over the weights of relevant pivot words in the pivot vocabulary $V^p$ 230. The CGC process 210 constructs the projection matrix 240, denoted as Proj(v, $v^t$), for the source domain S 120 and the target domain T 110 from a context matrix Cxt such that columns of the projection matrix 240 correspond to pivot words from the pivot vocabulary $V^p$ 230 and rows of the projection matrix 240 correspond to non-pivot words. See descriptions of step 315 of FIG. 3A, infra, for details of creating the projection matrix 240.

The cross-domain similarity graph $G^x$ 250 is a bipartite graph comprising a first set of vertices corresponding to the source centroids $C^s$ 220 and a second set of vertices corresponding to the target centroids $C^t$ 300. The CGC process 210 adds an edge between each pair of vertices (i, j) from the first set of vertices and the second set of vertices and assigns a weight of the edge with $$1-d^x(\overline{C}_i^t, \overline{C}_j^s)$$

such that the best alignment of the target centroids $C^t$ 300 to the source centroids $C^s$ 220 can be found by finding the maximum weighted bipartite match in the cross-domain. similarity graph $G^x$ 250. See descriptions of step 360 of FIG. 3C, infra, for details of the cross-domain similarity graph $G^x$ 250.

The target centroids $C^t$ 300 comprise a respective target centroid ten that represents each target cluster of k target clusters {$C_1^t$, $C_2^t$, ..., $C_k^t$} that partitions the target domain T 110. The respective target centroid $\overline{C}_i^t$ represents all target data items of the respective target cluster $C_i^t$. A target data item of the target domain T 110 may be assigned to a target centroid that is the nearest to the target data item of all the target centroids $C^t$ 300, and the target centroid and target data items assigned to the target centroid are collectively referred to as a target cluster. See descriptions of FIGS. 3B and 3C, infra, for details of the target centroids $C^t$ 300.

Figure 2A:
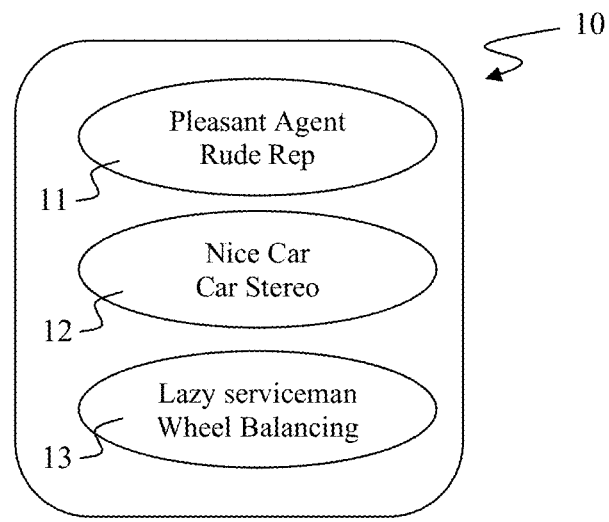
FIGS. 2A, 2B, and 2C illustrate examples of target clustering.
Figure 2B:
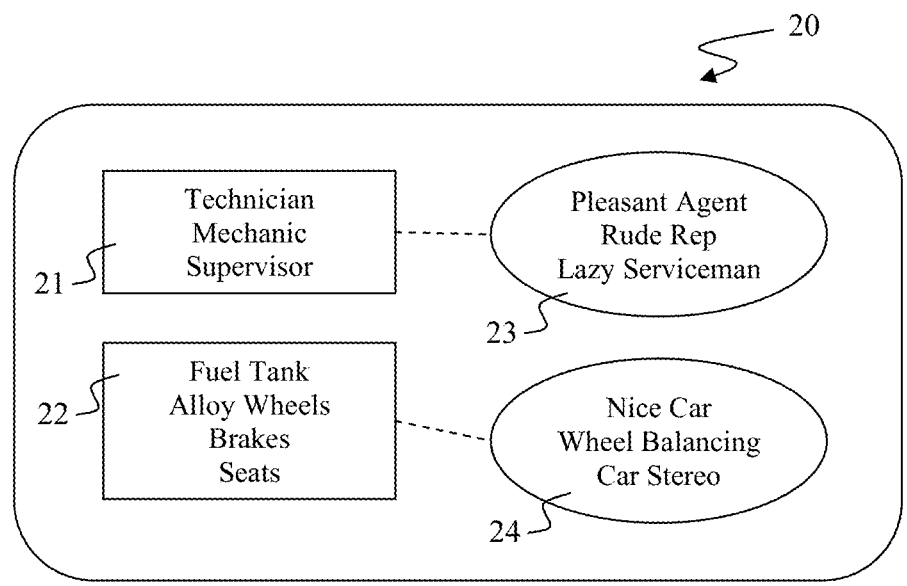
Figure 2C:
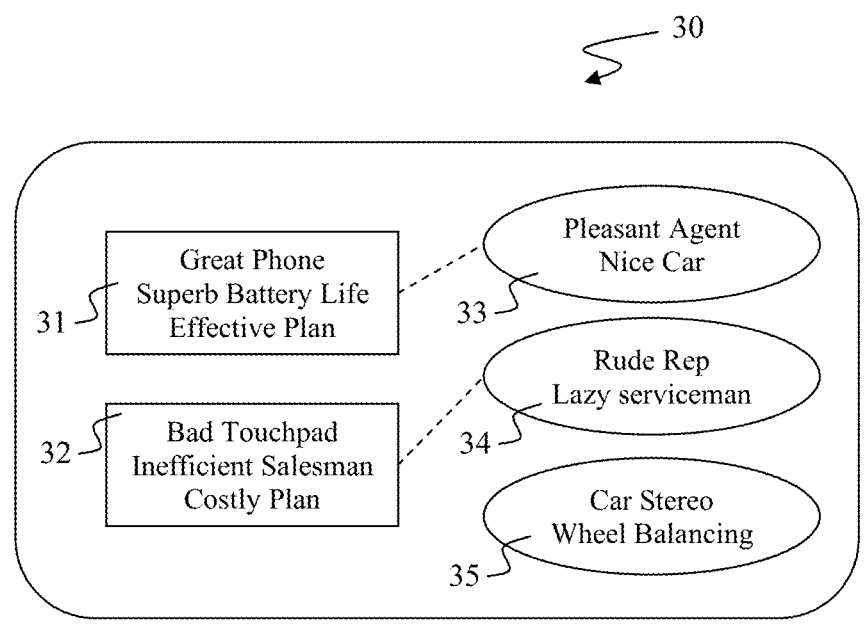

FIGS. 2A, 2B, and 2C illustrate examples of target clustering. In the present examples, the target domain is customer survey comments that are acquired through service desks of an automobile company. Analysts for the automobile company analyze the customer survey comments in various ways by clustering the target data into categorized accounts. FIG. 2A illustrates a first clustering 10 of the target domain based only on the target data similarities. The first clustering 10 generates three clusters of an agents cluster 11, a parts and accessories cluster 12, and a servicing cluster 13. The first clustering 10 is not guided by supervised partitioning and consequently the three clusters 11, 12 and 13 may not be useful to the analysts.

FIG. 2B illustrates a second clustering 20 of the target domain wherein the analysts intend to create a personnel cluster 23 and a car-related issue cluster 24. Two pre-existing supervised partitions of a sales personnel partition 21 and a motor-cycle related issue partition 22 are utilized as a source domain to guide clustering of the target domain. To align target clusters 23 and 24 with the source partitions 21 and 22, respectively, the second clustering 20 deviates from the first clustering 10 of FIG. 2A, supra. The more the source partitions employed for supervising target clustering are relevant to the target clusters, the greater the extent of deviation of the guided target clustering from the target data based clustering. For example, when the analysts provide a source domain of two partitions of a computer parts partition and an IT technician partition to guide the second clustering 20, the car-related issue cluster 24 would not be clearly formulated. For another example, when the analysts intend to formulate a target cluster of customer sentiments, a source partition created around customer sentiments is necessary to guide the target clustering.

FIG. 2C illustrates a third clustering 30 of the target domain based on source partitions of customer survey comments for telecommunication industry. Because automobile company and telecommunication industry are not relevant in the nature of the business and part names, the third clustering 30 is aligned around customer sentiments with the source partitions. A first source partition 31 and a first target cluster 33 are on positive customer sentiments. A second source partition 32 and a second target cluster 34 are on negative customer sentiments.

FIG. 2C demonstrates that a number of target clusters and a number of source partitions are not necessarily identical. The source partitions that are not relevant to the target domain do not affect target clustering. When there is no relevant source partition, the target domain is clustered based only on intrinsic similarities among target data, as shown by a third target cluster 35.

In formulae of this specification, superscripts s, t and x indicate elements of the source domain, the target domain and the cross domain, respectively.

FIG. 3 is a flowchart depicting a method for cross-guided clustering based on alignment between data domains and evaluating cross-domain clusterability of the data domains, in accordance with the embodiments of the present invention.

In step 300, the cross-guided clustering and clusterability evaluation (CGCE) process performs cross-guided clustering by use of a cross-guided clustering (CGC) process upon source domain data set and target domain data set. See descriptions of FIG. 3A, infra, for details of the cross-guided clustering (CGC) process. After performing step 300, the CGCE process proceeds with step 400.

In step 400, the CGCE process evaluates cross-domain clusterability of the target domain data set and the source domain data. set by use of a cross-domain clusterability evaluation (CCE) process. See descriptions of FIG. 4A, infra, for details of the cross-domain clusterability evaluation (CCE) process. After performing step 400, the CGCE process terminates.

In another embodiment, the cross-domain clusterability evaluation (CCE) process of step 400 is performed independently from the cross-guided clustering (CGC) process of step 300 upon the target domain data set and the source domain data set, or any other two domain data sets. Because step 400 evaluates cross-domain clusterability of the two domain data sets without using results from the cross-guided clustering process of FIG. 3A infra between the two domain data sets, step 400 may be performed standalone, prior to step 300, or after step 300.

Figure 3A:
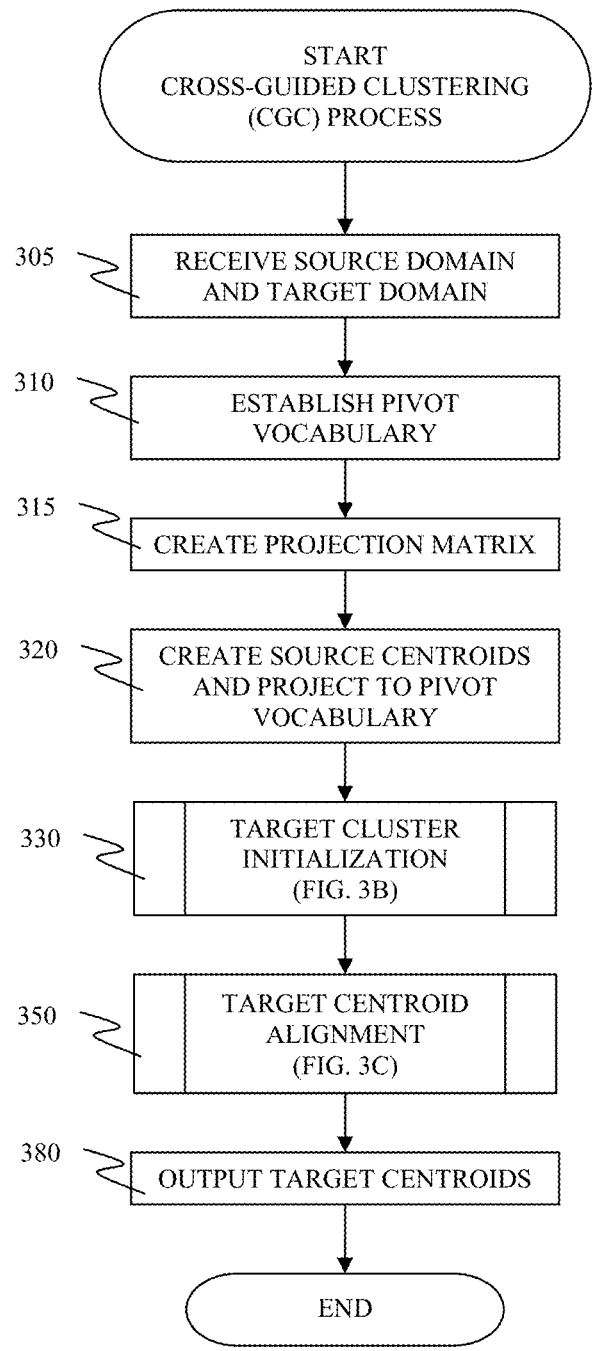
FIG. 3A is a flowchart depicting a method for cross-guided clustering based on alignment between data domains, in accordance with the embodiments of the present invention.

FIG. 3A is a flowchart depicting a method for cross-guided clustering based on alignment between data domains, in accordance with the embodiments of the present invention. in step 305, a cross-guided clustering (CGC) process receives a source domain and a target domain as inputs to automatically align target clusters with source partitions to guide the target clustering. The source domain comprises at least one source data item. The target domain comprises at least one target data item. Data items of the target domain and the source domain are text of any length. Examples of the data items may be, inter alia, a word, a phrase, a sentence, a document, etc.

Figure 3B:
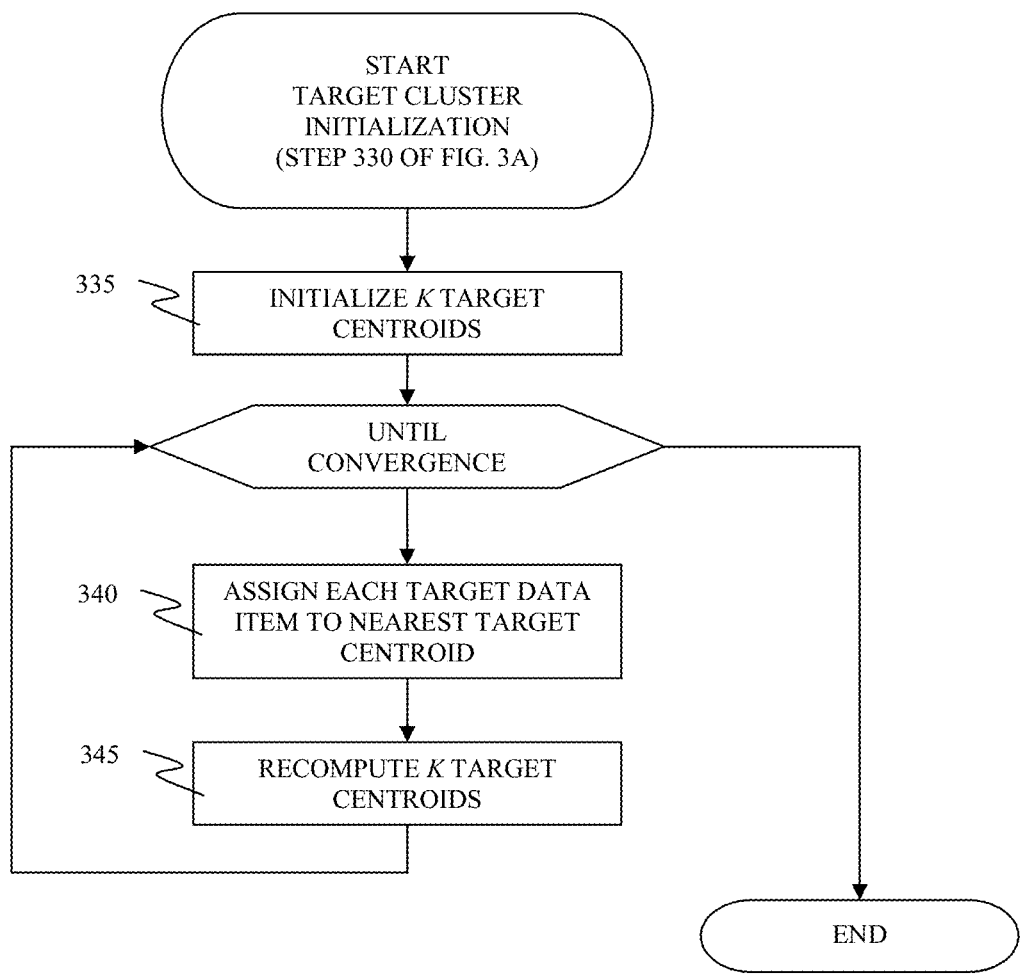
FIG. 3B is a flowchart depicting a method for initializing target clusters, step 330 of FIG. 3A, in accordance with the embodiments of the present invention.
Figure 3C:
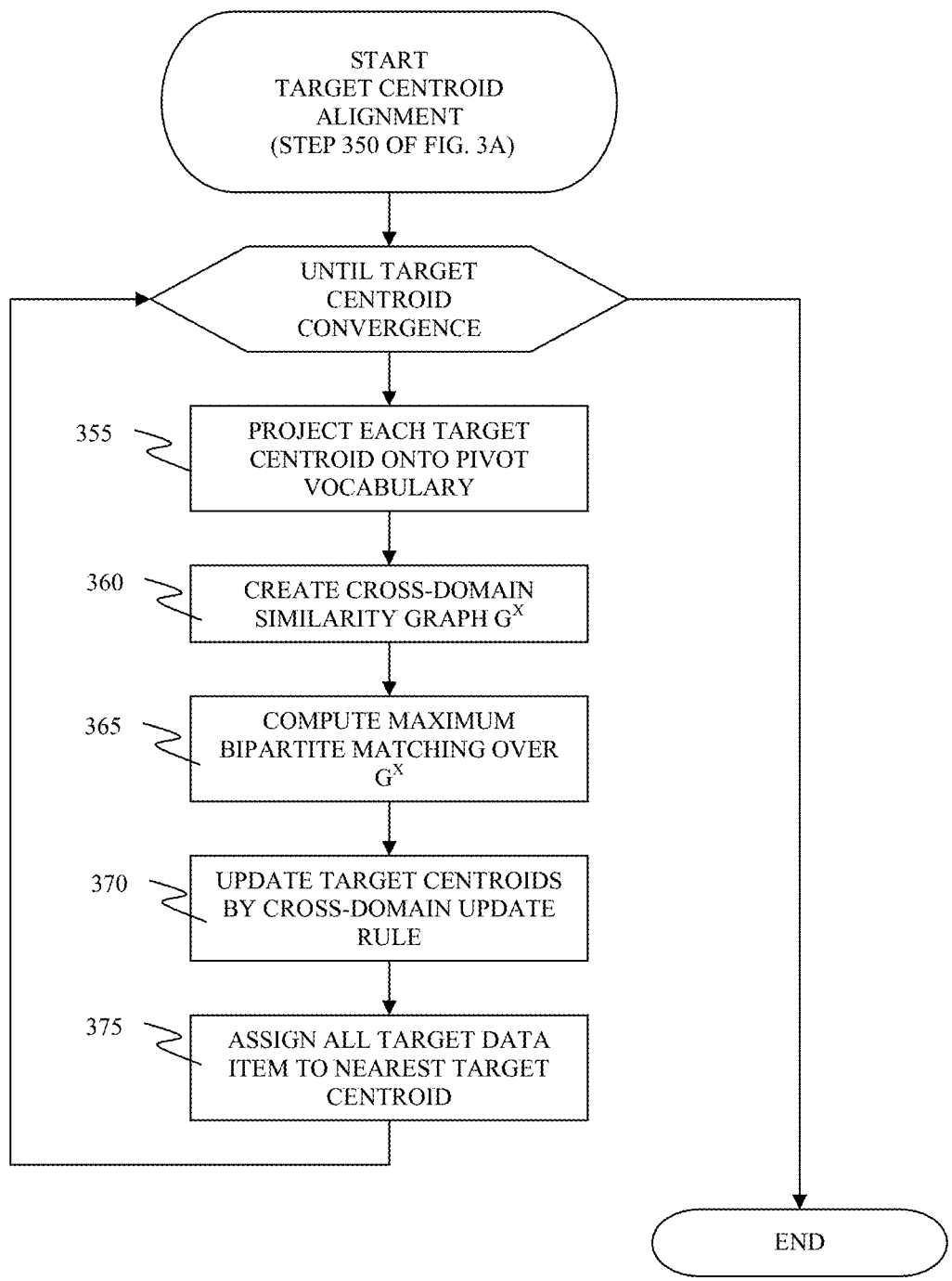
FIG. 3C is a flowchart depicting a method for aligning target centroids to the source centroids, step 350 of FIG. 3A, in accordance with the embodiments of the present invention.

Because the target data items and the source data items are from different domains having different vocabularies, the CGC process resolve the discrepancies between vocabularies of the target domain and the source domain by creating pivot vocabulary in step 310, projecting source centroids to the pivot vocabulary in step 320, and projecting target centroids to the pivot vocabulary in step 355 of FIG. 3C, infra. After performing step 305, the CGC process proceeds with step 310.

In step 310, the CGC process establishes the pivot vocabulary between the source domain and the target domain. The pivot vocabulary $V^p$ comprises at least one pivot words from the source vocabulary $V^s$ and the target vocabulary $V^t$ that are lexically identical. The pivot vocabulary may not have the same meaning in the target domain and the source domain. In this specification, the term "vocabulary" means attributes over which data items and centroids are defined. A distance measure between two data items is based on an assumption that the two data items being compared utilize same vocabulary.

Consequently, when comparing a target data item and a source data item from different domains, a cross-domain distance measure $d^x(t_i, s_i)$ is employed to compare clusters across domains. In one embodiment of the CGC process, the respective cross-domain distance measure $d^x(t_i, s_j)$ is pre-defined. In another embodiment, the respective cross-domain distance measure $d^x(t_i, s_j)$ is calculated as illustrated in descriptions of step 360 in FIG. 3C, infra. A target distance measure $d^t(\ )$ is used to assign target data items to target centroids and measure target divergence. The cross domain distance measure $d^x(\ )$ is used to align the target centroids with the source centroids and measure cross domain divergence. In this embodiment, the CGC process aligns each target cluster to at most one source partition, and vice versa.

The CGC process constructs a respective pivot weight pw(v) for each pivot word v in the pivot vocabulary $V^p$. The respective pivot weight pw(v) represents semantic similarity of the pivot word in the source domain and the target domain. The CGC process computes pivot weights based on an assumption that a pivot word is semantically similar across domains where the pivot word is used in similar contexts. Thus the CGC process constructs a respective word-word context matrix $Cxt^t$ and $Cxt^s$ for both the target domain and the source domain. An entry $Cxt(v, v^j)$ of the context matrix denotes a number of times words v and $v^j$ occur within m tokens of each other over all documents in one domain. The CGC process employs a standard term frequency—inverse document frequency (TF-IDF) weighting to assign a weight to each entry $Cxt(v, v^l)$ of the context matrix. A context vector $Cxt(v)$ for a word v is the row corresponding to v in the context matrix Cxt, and captures the aggregated context of the word v in the respective domain. The pivot weight $pw(v)$ is calculated as the cosine similarity of a first context vector $Cxt^S(v)$ for the source domain and a second context vector $Cxt^t(v)$ for the target domain:

$$pw(v)=\beta+(1-\beta)\cos(Cxt^S(v), Cxt^t(v)),$$

where β provides smoothing over sparsity and noise in the data.

All words in the source domain and the target domain other than the pivot words are non-pivot words. See descriptions of step 360 in FIG. 3C, for details of utility of the pivot vocabulary. After performing step 310, the CGC process proceeds with step 315.

In step 315, the CGC process creates a respective projection matrix $Proj(v, v^l)$ for each domain from a context matrix Cxt such that columns of the projection matrix $Proj(v, v^l)$ correspond to pivot words from the pivot vocabulary $V^p$ and rows of the projection matrix $Proj(v, v^l)$ correspond to non-pivot words. For each non-pivot word v, $Proj(v, v^p)$ defines how the weight of non-pivot word v is distributed over pivot word $v^p$. The CGC process constructs a source projection matrix $Proj^s(v, v^l)$ for the source domain and a target projection matrix $Proj^t(v, v^l)$ for the target domain. By projecting the non-pivot synonyms to the pivot vocabulary $V^p$, the CGC process takes non-pivot synonyms of the source vocabulary and the target vocabulary that are not lexically similar into similarity computation. The CGC process calculates the projection matrix to distribute weights of the non-pivot synonyms of the target domain and the source domain into a respectively relevant pivot words. After performing step 315, the CGC process proceeds with step 320.

In step 320, the CGC process creates source centroids and subsequently projects each source centroid to the pivot vocabulary. The projected weight $wt^p(v, \overline{C}_j^s)$ for pivot word v in source centroid $\overline{C}_j^s$ is the augmented weight after projecting weights of all relevant non pivot words in the source vocabulary on the pivot word v:

$$wt^p(v, \overline{C}_j^s)=wt(v, \overline{C}_j^s)+\Sigma_{v^l \in V^s-V^p}Proj^s(v^l, v).$$

After performing step 320, the CGC process proceeds with step 330.

In step 330, the CGC process initializes target clusters. See descriptions of FIG. 3B, infra, for details of step 330. Then the CGC process proceeds with step 350. In step 350, the CGC process aligns target centroids to the source centroids. See descriptions of FIG. 3C, infra, for details of step 350. After performing step 330, the CGC process proceeds with step 380.

In step 380, the CGC process outputs the target centroids to users. After performing step 380, the CGC process terminates and the CGCE process proceeds with step 400 of FIG. 3 supra.

FIG. 3B is a flowchart depicting a method for initializing target clusters, step 330 of FIG. 3A, supra, in accordance with the embodiments of the present invention.

In step 335, the CGC process initializes k number of target centroids. After performing step 335, the CGC process proceeds with step 340.

In step 340, the CGC process assigns each target data item to a nearest target centroid. After performing step 340, the CGC process proceeds with step 345.

In step 345, the CGC process recalculates the k number of target centroids from assigned target data items.

In one embodiment of the present invention, after performing step 345, the CGC process determines whether the target centroids converge. If the CGC process determines that the target centroids do not converge yet, the CGC process loops back to step 340. If the CGC process determines that the target centroids converge, the CGC process proceeds with step 350 of FIG. 3A, supra.

In another embodiment of the present invention, the CGC process performs steps 340 and 345 for n number of times and proceeds with step 350 of FIG. 3A, supra. FIG. 3C is a flowchart depicting a method for aligning target centroids to the source centroids. step 350 of FIG. 3A, supra, in accordance with the embodiments of the present invention.

The cross-domain divergence depends both on the current target centroids and the cross domain alignment. The CGC process minimizes the cross-domain divergence by updating assignment of target data items to current target centroids in step 375, by updating the cross-domain alignment based on the current target centroids in step 365, and by re-estimating the target centroids based on the current data item assignment and the current cross-domain alignment in step 370.

In step 355, the CGC process projects each target centroids onto pivot vocabulary, which is analogous to calculating projected weight for source centroids. The projected weight $wt^p(v, \overline{C}_i^t)$ for pivot word v in a target centroid $\overline{C}_i^t$ is the augmented weight after projecting weights of all relevant non pivot words in the target vocabulary on the pivot word v:

$$wt^p(v, \overline{C}_i^t) = wt(v, \overline{C}_i^t) + \sum_{v' \in V^t - V^p} Proj^t(v', v)$$

After performing step 355, the CGC process proceeds with step 360.

In step 360, the CGC, process creates a cross-domain similarity graph $G^x$ over the source centroids and the target centroids using projected weights of pivot words in the source domain and the target domain. To find a cross-domain alignment, the CGC process constructs the cross-domain similarity graph $G^x$ that is a bipartite graph comprising a first set of vertices S corresponding to source centroids, and a second set of vertices T corresponding to target centroids. An edge of the cross-domain similarity graph $G^x$ between each pair of vertices (i, j) from S and T has a weight of:

$$1-d^x(\overline{C}_i^t, \overline{C}_j^s)$$

In one embodiment, to determine cross-domain similarity between the target data items and the source data items, the CGC process measures the cross-domain distance between a target centroid and a source centroid comprising a respective data set by $$d^x(C_i^t, C_j^s)=1-\cos(C_i^t, C_j^s)$$

where $\cos(v_1, v_2)$ represents the cosine similarity of two weight vectors $v_1$ and $v_2$:

$$\cos(v_1, v_2)=\Sigma_{\alpha_i}wt(v_1, \alpha_i) \times wt(v_2, \alpha_i)$$

where $a_i$ represents at least one dimension of the two weight vectors $v_1$ and $v_2$. The CGC process compares a target centroid vector and a source centroid vector by comparing weights over pivot words that are lexically the same.

In one embodiment of the present invention, the CGC process employs a hard clustering setting in which each target data item $t_1$ is assigned to only one target cluster $C_j^t$. In the same embodiment, the CGC process also employs a k-means setting that partitions the target domain T by assigning a respective target data item into a respective target cluster $C_j^t$ that has a target centroid $\{\overline{C}_i^t\}$ nearest to the respective target data item $t_j$ among all target centroids. A distance between a target data item $t_j$ and a target centroid $\{\overline{C}_i^t\}$ is represented by $d^t(t_j, \overline{C}_i^t)$. A divergence of a target cluster $C_i^t$, which is denoted by $D^t(C_i^t)$, is defined as a sum of squared distances of all target data items to a respective target centroids in the target cluster $C_i^t$, $$D^t(C_i^t) = \sum_{t_j} (d^t(t_j, \overline{C}_i^t))^2 \delta^t(t_j, \overline{C}_i^t)$$

where $\delta^t(t_j, \overline{C}_i^t)$ is 1 if the target data item $t_j$ is assigned to the target cluster $C_i^t$ and 0 otherwise.

Conventional k-means clustering seeks k number of best target centroids for respective target clusters that partition the target domain T such that the total divergence $\Sigma_i D^t(C_i^t)$ over all the target clusters in the target domain T is minimal.

In contrast with the conventional k-means clustering, the cross-guided clustering of the present invention as performed by the CGC process aligns the target clusters with the source clusters to generate the target centroids $C^t$ in a more effective and guided manner. Provided a cross-domain alignment between source partitions and target clusters, the CGC process calculates a cross-domain divergence as $$D^x(C^t, C^s) = \Sigma_{C_i^t} \Sigma_{C_j^s} (d^x(\overline{C}_i^t, \overline{C}_j^s))^2 \delta^x(C_i^t, C_j^s)|C_i^t| \quad [EQ. 1]$$

where, in one embodiment, $\delta^x(C_i^t, C_j^s)$ is 1 if $C_i^t$ is aligned with $C_j^s$, and 0 otherwise. To make the cross domain divergence $D^x(C^t, C^s)$ comparable to the divergence of target cluster $D^t(C_i^t)$, the CGC process weighs a respective size of each target cluster, denoted as $|C_i^t|$, into the cross-domain divergence calculation.

Provided the target centroids $C^t$, an assignment of target data items to the target centroids $C^t$, and an alignment between source partitions and the target centroids $C^t$, the CGC process calculates the combined divergence that strikes a balance between the target divergence and the cross-domain divergence:

$$D(C^t, C^s) = \alpha D^t(C^t) + (1-\alpha) D^x(C^t, C^s) \quad [EQ. 2]$$

where $\alpha$ indicates a relative importance of the target divergence and the cross-domain divergence over all clusters in the target domain and the source domain. When $\alpha=1$, the combined divergence $D(C^t, C^s) = D^t(C^t)$ corresponds to target-only clustering. When $\alpha=0$, the combined divergence $D(C^t, C^s)$ leads to target clusters that are as similar as possible to source partitions, but not tight internally. The parameter a represents how relevant all clusters of the source domain and the target domain and how the target centroid convergence and the cross-domain alignment are traded off in the cross-domain update rules of EQ. 3, infra. The CGC process generates the target centroids $C^t$ 300 such that the combined divergence $D(C^t, C^s)$ is minimal, $$\min_t \sum D(C^t, C^s)$$

provided source clusters $C^s$.

The similarity between a source centroid and a target centroid is computed using a modified version of cosine similarity that takes the pivot weights into account:

$$sim^x(\overline{C}_i^t, \overline{C}_j^s) = \Sigma_{v \in V^p} wt(v, \overline{C}_i^t) pw(v),$$

where $wt(v, \overline{C}_i^t)$ represents the weight of pivot word v in the i-th target centroid $\overline{C}_i^t$, $wt(v, \overline{C}_j^s)$ represents the weight of pivot word v in the j-th source centroid $\overline{C}_j^s$, and $pw(v)$ is the pivot weight of the word v from step 310 of FIG. 3A, supra. After performing step 360, the CGC process proceeds with step 365.

In step 365, the CGC process computes a maximum weighted bipartite match over the cross-domain similarity graph $G^x$ to find a best alignment between source centroids and target centroids. A match is a subset of the edges such that any vertex is spanned by at most one edge, and a weight of a match is the sum of the weights of the included edges.

In a first embodiment of step 365, the CGC finds a best match over the cross-domain similarity graph $G^x$ that is a complete bipartite graph. Consequently, the every target cluster is aligned to one source partition, even in cases of the target cluster is dissimilar to the source partition.

In a second embodiment of step 365, the CGC process disregards all edges in the match with weights below some threshold such that a target cluster is not matched to a dissimilar source partition.

In a third embodiment of step 365, the CGC process defines $\delta^x(\overline{C}_i^t, \overline{C}_j^s)$ for $D^x(\ )$ as a match weight, which is 1 if $C_i^t$ is aligned with $C_j^s$, and 0 otherwise. In this embodiment, the weaker the match with the source, the lower is the penalty for divergence from that source centroid.

After performing step 365, the CGC process proceeds with step 370.

In step 370, the CGC process updates the target centroids according to a cross-domain update rule to align the target centroids with the source centroids.

cross-domain update rule is formulated based on assumptions that all target data items correspond to a target centroid and that the target centroid does not necessarily correspond to a source centroid. The cross-domain update rules are formulated to re-estimate respective target centroid by minimizing divergence of target clusters based on target data items and the source centroids $C^s$. The cross-domain update rules respective to each target centroid $C_i^t$ of the target centroids $C^t$ are provided to the CGC process as a result of differentiating and resolving the divergence function of the target clusters $$\frac{d(D(C^t, C^s))}{d(\overline{C}_i^t)} = 0,$$

which is $$\overline{C}_i^t = \frac{\alpha \sum_{t_i \in C_i^t} t_i + (1-\alpha) \sum_j \delta^x(C_i^t, C_j^s) \overline{C}_j^s}{\alpha |C_i^t| + (1-\alpha)|C_i^t| \Sigma_j \delta^x(C_i^t, C_j^s)} \quad [EQ. 3]$$

The CGC process repeatedly updates each target centroid $\overline{C}_i^t$ according to respective cross-domain update rule.

A first term of the numerator, $\alpha \Sigma_{t_i \in C_i^t} t_i$, of the cross-domain update rules represents a target centroid convergence. The CGC process gradually updates each target centroid toward the 'center' of respective target cluster to which a respective target centroid and target data items assigned to the respective target centroid are members.

A second term of the numerator, $(1-\alpha)\Sigma_j \delta^x(C_i^t, C_j^s)\overline{C}_j^s$, of the cross-domain update rules represents the cross-domain alignment of target centroids to source centroids. The CGC process also aligns target centroids to corresponding source centroids, but the cross-domain alignment is affected by the extent of match with the source centroid. A target centroid moves along a corresponding source centroid across domains only when the target centroid has a significant match in the source domain. After performing step 370, the CGC process proceeds with step 375.

In step 375, the CFC process reassigns all target data items to a nearest target centroid respective to the target data item.

In one embodiment of the present invention, after performing step 375, the CGC process determines whether the target centroids converge to be aligned with source centroids. If the CGC process determines that the target centroids do not converge yet, the CGC process loops back to step 355. If the CGC process determines that the target centroids converge, the CGC process proceeds with step 380 of FIG. 3A, supra.

In another embodiment of the present invention, the CGC process performs steps 355 through 375 form number of times and proceeds with step 380 of FIG. 3A, supra.

Figure 4A:
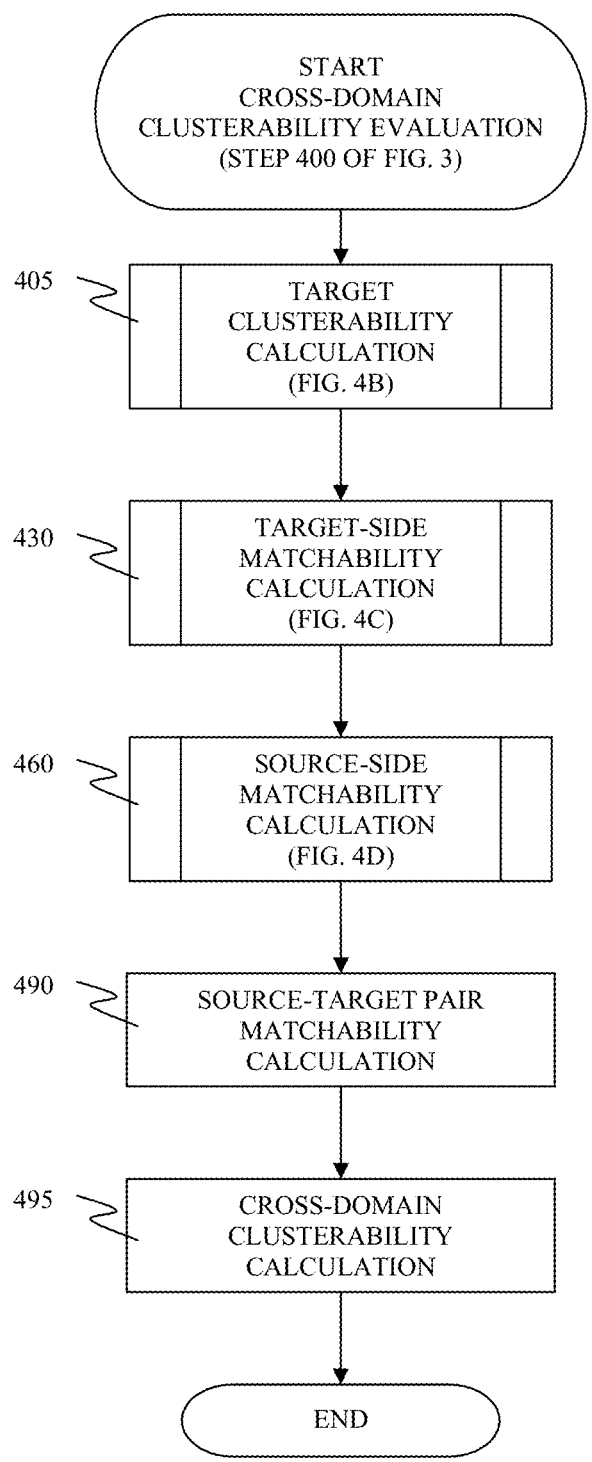
FIG. 4A is a flowchart depicting a method for evaluating cross-domain clusterability of the target domain data set and the source domain data set, step 400 of FIG. 3, in accordance with the embodiments of the present invention.

FIG. 4A is a flowchart depicting a method for evaluating cross-domain clusterability of the target domain data set and the source domain data set, step 400 of FIG. 3, supra, in accordance with the embodiments of the present invention.

In step 405, the CGC process calculates target clusterability quantifying how clusterable the target domain data set T is. See descriptions of FIG. 4B, infra, for steps for calculating the target clusterability that is defined as an average of a respective clusterability of all target data item $t_i$, i=1 . . . k in the target domain data set T:

$$Cab(T|\overline{C}^t) = \Sigma_{\{t_i \in T\}} Cab(t_i|\overline{C}^t)/|T| \quad [EQ. 4]$$

The clusterability of the i-th target data item $t_i$, denoted as $Cab(t_i|\overline{C}^t)$, quantifies how unambiguously the i-th target data item $t_i$ can be assigned to a respective true target centroid $\overline{C}_*^t(t_i)$ based on similarities of the i-th target data item $t_i$ to the k number of gold standard target centroids $\overline{C}^t$. In this specification, the clusterability of the i-th target data item $t_i$, for a k number of gold standard target centroids $\overline{C}^t$ is defined as:

$$Cab(t_i|\overline{C}^t)=sim(t_i, \overline{C}_*^t(t_i))-max_{\{\overline{C}_j^t \neq \overline{C}_*^t(t_i)\}}sim(t_i, \overline{C}_j^t),$$

wherein $\overline{C}_*^t(t_i)$ indicates the respective true target centroid of the i-th target data item $t_i$ acquired by conventional k-means clustering, wherein $sim(t_i, \overline{C}_*^t(t_i))$ indicates a respective similarity of the i-th target data item $t_i$ to the respective true target centroid, wherein $sim(t_i, \overline{C}_j^t)$ indicates a respective similarity of the i-th target data item $t_i$ to a respective gold standard target centroid $\overline{C}_j^t$, i=1 . . . k, and wherein $max_{\{\overline{C}_j^t \neq \overline{C}_*^t(t_i)\}}sim(t_i, \overline{C}_j^t)$ indicates how similar the i-th target data item $t_i$ is to a nearest 'non-true' target centroid.

In one embodiment of the present invention, the respective gold standard target centroids are predefined and made available to the CGC process. In another embodiment, entropy over the k number of gold standard target centroids can be used to measure clusterability of the i-th target data item $t_i$, in place of the similarity. The target clusterability $Cab(T|\overline{C}^t)$ is an upper bound of a second target clusterability acquired by conventional k-means clustering algorithm, because the target clusterability of EQ. 4 supra is conditioned on correct discovery of the target centroids. A value of the clusterability of the target domain data set T $Cab(T|\overline{C}^t)$ is within a range of [−1.0, +1.0].

The clusterability has an upper limit (1.0) for the target domain data set T that is perfectly clusterable, in which every target data item has similarity (1.0) to the respective true target centroid of each target data item, and similarity (0.0) to all other centroids. The clusterability has a lower limit (−1.0) for the target domain data set T that is perfectly unclusterable, in which every target data item has similarity (0.0) to the respective true target centroid of each target data item, and similarity (1.0) to any other centroid that the respective true target centroid of the target data item. The CGC proceeds with step 430 after calculating the target clusterability.

In step 430, the CGC process calculates target-side matchability quantifying how well all target centroids are matched to source centroids. See descriptions of FIG. 4C, infra, for steps for calculating the target-side matchability that is defined as an average of a respective matchability of all target centroids $\overline{C}^t$ to all source centroids $\overline{C}^s$:

$$Mab(\overline{C}^t | \overline{C}^s) = \sum_{\overline{C}_i^t} Mab(\overline{C}_i^t | \overline{C}^s)/|C^t|$$

The respective matchability of an i-th target centroid $\overline{C}_i^t$, i=1 . . . k to the source centroids $\overline{C}^s$ defined as:

$$Mab(\overline{C}_i^t|\overline{C}^s)=sim^x(\overline{C}_i^t, \overline{C}_*^s(\overline{C}_i^t))-max_{\{\overline{C}_j^s \neq \overline{C}_*^s(\overline{C}_i^t)\}}sim^x(\overline{C}_i^t, \overline{C}_j^s),$$

wherein $\overline{C}(\overline{C}_i^t)$ indicates a first source centroid that is the most similar to the i-th target centroid $\overline{C}_i^t$, that is $\overline{C}_*^s(\overline{C}_i^t)=max_{\{\overline{C}_j^s\}}sim^x(C_i^t, \overline{C}_j^s)$, wherein $sim^x(\overline{C}_i^t, \overline{C}_j^s)$ indicates a cross-domain similarity of the i-th target centroid $\overline{C}_i^t$ to each source centroid $\overline{C}_j^s$, and wherein $max_{\{\overline{C}_j^s \neq \overline{C}_*^s(\overline{C}_i^t)\}}sim^x(\overline{C}_i^t, \overline{C}_j^s)$ indicates a cross-domain similarity between the i-th target centroid $\overline{C}_i^t$ and a second source centroid that is the closest other than the first source centroid. The CGC proceeds with step 460 after calculating the target-side matchability.

In another embodiment, joint-entropy over the k number of gold standard target centroids can be used to measure matchability of the target centroids to the source centroids.

In step 460, the COC process calculates source-side matchability quantifying how well all source centroids are matched to target centroids. See descriptions of FIG. 4D, infra, for steps for calculating the source-side matchability that is defined as an average of a respective matchability of all source centroids $\overline{C}^s$ to all target centroids $\overline{C}^t$:

$$Mab(\overline{C}^s | \overline{C}^t) = \sum_{\overline{C}_j^s} Mab(\overline{C}_j^s | \overline{C}^t)/|C^s|$$

The respective matchability of a j-th source centroid $\overline{C}_j^s$, j=1 . . . k to the target centroids $\overline{C}^t$ is defined as:

$$Mab(\overline{C}_j^s|\overline{C}^t)=sim^x(\overline{C}_j^s, \overline{C}_*^t(\overline{C}_j^s))-max_{\{\overline{C}_i^t \neq \overline{C}_*^t(\overline{C}_j^s)\}}sim^x(\overline{C}_j^s, \overline{C}_i^t),$$

wherein $\overline{C}_*^t(\overline{C}_j^s)$ indicates a first target centroid that is the most similar to the j-th source centroid $\overline{C}_j^s$, that is $\overline{C}_*^t(\overline{C}_j^s)=max_{\{\overline{C}_i^t\}}sim^x(\overline{C}_j^s, \overline{C}_i^t)$, wherein $sim^x(\overline{C}_j^s, \overline{C}_i^t)$ indicates a cross-domain similarity of the j-th source centroid $\overline{C}_j^s$ to each target centroid $\overline{C}_i^t$, and wherein $max_{\{\overline{C}_i^t \neq \overline{C}_*^t(\overline{C}_j^s)\}}sim^x(\overline{C}_j^s, \overline{C}_i^t)$ indicates a cross-domain similarity between the j-th source centroid eand a second target centroid that is the closest other than the first target centroid. The CGC proceeds with step 490 after calculating the source-side matchability.

In step 490, the CGC process calculates source-target pair matchability that is defined as an average of the target-side matchability from step 430 supra and the source-side matchability from step 460 supra:

$$\text{Mab}(\overline{C}^t, \overline{C}^s) = (\text{Mab}(\overline{C}^t|\overline{C}^s) + \text{Mab}(\overline{C}^s|\overline{C}^t))/2$$

The source-target pair matchability $\text{Mab}(\overline{C}^t, \overline{C}^s)$ is an upper bound on how beneficial a source domain data set can be for clustering a target domain data set, because the source-target pair matchability is conditioned on correct discovery of the true target centroids. In contrast with the calculation of clusterability that utilizes true matching centroid in the same domain, the most similar source centroid is employed to calculate matchability of a target centroid, and the most similar target centroid is employed to calculate matchability of a source centroid. In calculating source-target pair matchability, it is sufficient for each target centroid to unambiguously match up with a respective source centroid to obtain supervision for cross-guided target clustering. The respective source centroid matched to each target centroid does not have to be a true centroid. Consequently, a value of the source-target pair matchability is within a range [0.0, 1.0], without having a negative value.

In step 495, the CGC process calculates the cross-domain clusterability of the target data set T for a predefined set of source centroids, that is defined as a linear combination of target clusterability from step 405 and the source-target pair matchability from step 490:

$$\text{Cab}(T|C^S, C^t) = \alpha\text{Cab}(T|C^t) + (1-\alpha)\text{Mab}(C^S, C^t) \quad [\text{EQ. 5}]$$

where $\alpha$ is a trade-off parameter indicating the relative importance of the target divergence and the cross-domain divergence over all clusters in the target domain and the source domain, as described in EQ. 2 of FIG. 3C, supra.

Data calculated in each step of the CGC process is stored and communicated to users. In one embodiment of the present invention, the CGC process utilizes the target clusterability value from step 405 and the cross-domain clusterability value from step 495 to automatically determine whether cross-guided clustering of the target domain is improved by utilizing partitioning of the source domain from conventional k-means target clustering.

The cross-domain clusterability measures quality of clustering by considering the correctness of clustering decisions over all document pairs. Examples of conventional methods for evaluating pair-wise clustering may be, inter alia, standard F1 measure, Adjusted Rand Index (ART), etc.

Examples of data set comprising the target domain and/or the source domain, may be, inter alia, newsgroups, industry catalogs, categorized technology database such as 20NG newsgroups, Reuters Corpus Volumes, and Dmoz from TechTC repository, respectively available at http://people.csail.mit.edu/jrennie/20Newsgroups/, http://www.davidlewis.com/resources/testcollections/rcv1/, and http://techtc.cs.technion.ac.il/. These data sets comprise hundreds to several thousands of documents in each domain.

In one embodiment of the present invention, the CGC process sets the parameter $\alpha = 0.5$ of EQ. 2 in description of FIG. 3C, supra, to maximize clustering performance improvement over conventional k-means clustering over a data set. Depending on characteristics of data set, the cross-domain clusterability peaks wherein $\alpha = [0.5 \ldots 0.6]$, indicating that clustering performance improvement over conventional k-means clustering over the data set is a maximum.

Figure 4B:
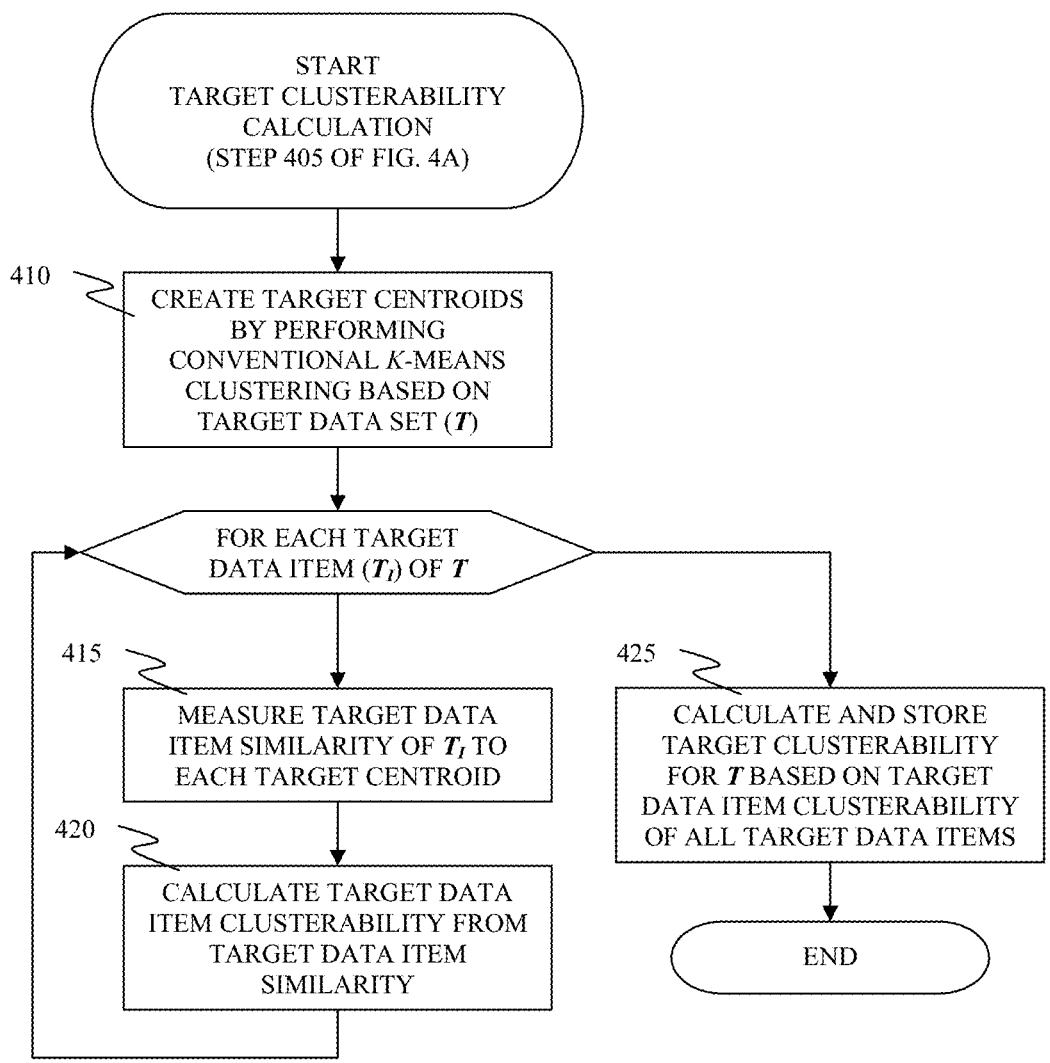
FIG. 4B is a flowchart depicting a method for calculating target clusterability of the target domain data set, step 405 of FIG. 4A, in accordance with the embodiments of the present invention.

FIG. 4B is a flowchart depicting a method for calculating target clusterability of the target domain data set, step 405 of FIG. 4A, supra, in accordance with the embodiments of the present invention.

In step 410, the CGC process creates k number of target centroids $\overline{C}^t$ by performing conventional k-means clustering on the target data set T. The conventional k-means clustering is solely based on the target data set T that takes inherent characteristics of n number of target data items $t_i$, i=1 ... n into account but does not take partitioning of the source domain data set into account. The k number of target centroids $\overline{C}^t$ that had been created are also referred to as "gold standard" target centroids from a group of target data items that had been assigned to respective true clusters. Then, the CGC process proceeds with step 415.

An illustrative example of true cluster s and gold standard centroids may be, inter alia, a categorized technology databases comprising documents. Wherein all documents that are assigned to a category CLASS_A of the database are identifiable, the category CLASS_A is referred to a true cluster and a centroid of said all documents of CLASS_A is referred to as a gold standard centroid.

Steps 415 and 420 are performed for each target data item $t_1$ for all target data items in the target data set T. After a respective target clusterability of all target data items in the target data set T are calculated, the CGC process proceeds with step 425.

In step 415, the CGC process measures similarity of a current target data item ti to each target centroid of the k number of target centroids $\overline{C}_j^t$, j=1 ... k, as notated $\text{sim}(t_i, \overline{C}_j^t)$, wherein the similarity is measured by a distance between the current target data item $t_i$ and said each target centroid data as in step 340 of FIG. 2B supra.

In step 420, the CGC process calculates target data item clusterability for the current target data item notated as $\text{Cab}(t_i|\overline{C}^t)$, from the similarity of the current target data item $t_i$:

$$\text{Cab}(t_i|\overline{C}^t) = \text{sim}(t_i, \overline{C}_*^t(t_i)) - \max_{\{\overline{C}_j^t \neq \overline{C}_*^t(t_i)\}} \text{sim}(t_i, \overline{C}_j^t),$$

wherein $\overline{C}_*^t(t_i)$ indicates the respective true target centroid of the i-th target data item $t_i$ acquired by conventional k-means clustering, wherein $\text{sim}(t_i, \overline{C}_*^t(t_i))$ indicates a respective similarity of the i-th target data item $t_i$ to a respective gold standard target centroid $\overline{C}_i^t$, i=1 ... k, and wherein $\max_{\{\overline{C}_j^t \neq \overline{C}_*^t(t_i)\}}$ indicates how similar the i-th target data item is to a nearest 'non-true' target centroid.

In step 425, the CGC process calculates and stores target clusterability, notated as $\text{Cab}(T|\overline{C}^t)$, that is defined as an average of a respective clusterability of all target data $t_i$, i=1 ... k in the target domain data set T by used of all target data item clusterability $\text{Cab}(t_i|\overline{C}^t)$, i=1 ... k, from step 420:

$$\text{Cab}(T|\overline{C}^t) = \Sigma_{\{t_i \in T\}} \text{Cab}(t_i|\overline{C}^t)/|T| \quad [\text{EQ. 4}]$$

Figure 4C:
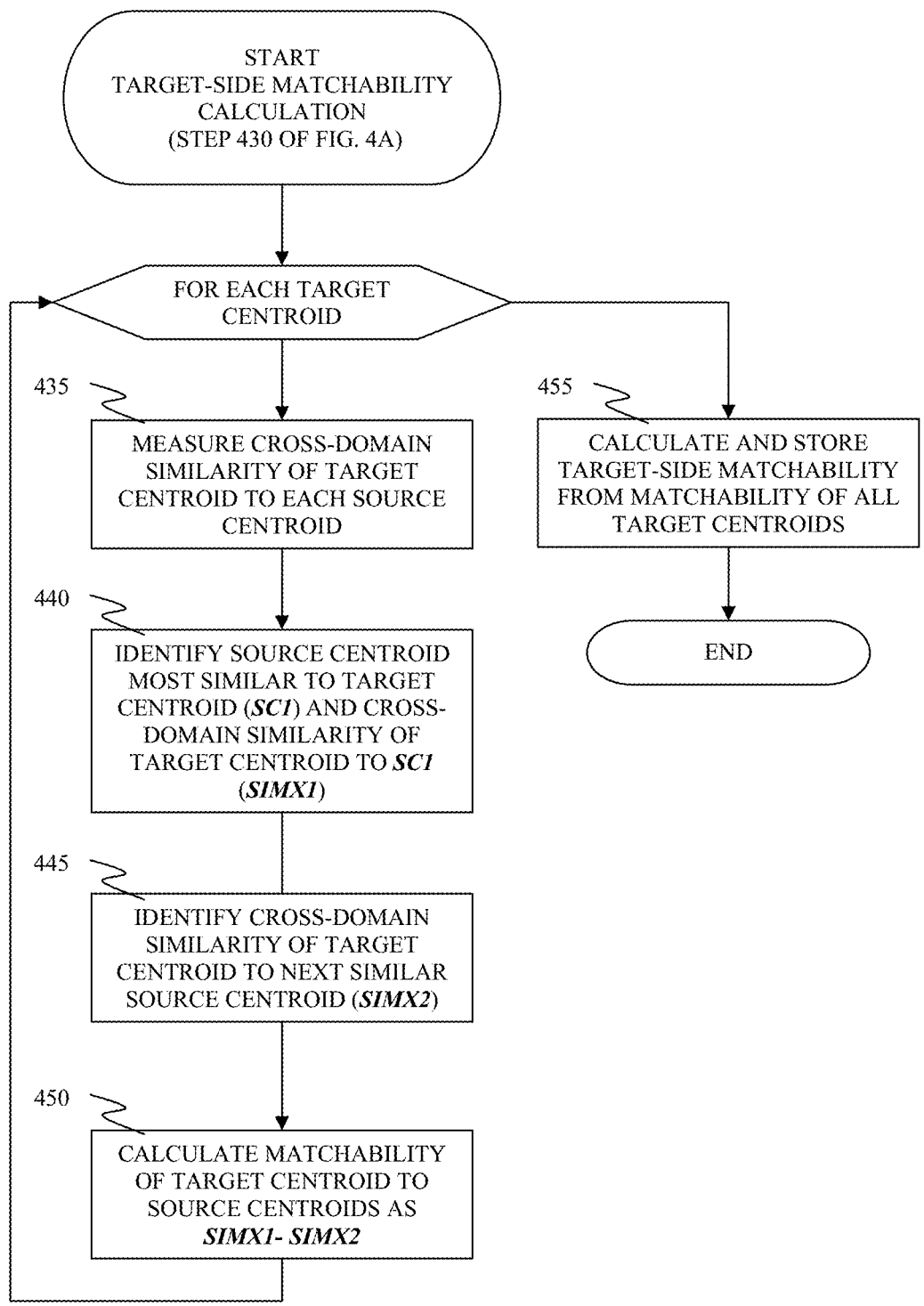
FIG. 4C is a flowchart depicting a method for calculating target-side matchability of the target domain data set, step 430 of FIG. 4A, in accordance with the embodiments of the present invention.

After storing the target clusterability for the target data domain in step 425, the CGC process proceeds with step 430 of FIG. 4A, supra, FIG. 4C is a flowchart depicting a method for calculating target-side matchability of the target domain data set, step 430 of FIG. 4A, supra, in accordance with the embodiments of the present invention.

Steps 435 and 450 are performed for each target centroid $\overline{C}_i^t$, i=1 ... k of the target domain. After a respective target matchability of all target centroids are calculated, the CGC process proceeds with step 455.

In step 435, the CGC process measures cross-domain similarity of a current target centroid $\overline{C}_i^t$ to each source centroid of the source domain, denoted as $\text{sim}^x(\overline{C}_i^t, \overline{C}_j^s)$. Then the CGC process proceeds with step 440.

In step 440, the CGC process identifies a first source centroid that is most similar to the current target centroid $\overline{C}_i^t$, denoted as $\overline{C}_*^s(\overline{C}_i^t)$, and a first cross-domain similarity of the current target centroid to the first source centroid, denoted as $\text{sim}^x(\overline{C}_i^t, \overline{C}_*^s(\overline{C}_i^t))$. Then the CGC process proceeds with step 445.

In step 445, the CGC process identifies a second cross-domain similarity of the current target centroid $\overline{C}_i^t$ to a second source centroid that is most similar to the current target centroid $\overline{C}_i^t$ next to the first source centroid, denoted as $\max_{\{\overline{C}_j^s \neq \overline{C}_*^s(\overline{C}_i^t)\}} \text{sim}^x(\overline{C}_i^t, \overline{C}_j^s)$. Then the CGC process proceeds with step 450.

In step 450, the CGC process calculates matchability of the current target centroid $\overline{C}_i^t$ to all source centroids $\overline{C}^s$, denoted as $\text{Mab}(\overline{C}_i^t | \overline{C}^s)$, by subtracting the second cross-domain similarity of the current target centroid $\overline{C}_i^t$ in step 445 from the first cross-domain similarity of the current target centroid $\overline{C}_i^t$ in step 440:

$$\text{Mab}(\overline{C}_i^t|\overline{C}^s)=\text{sim}^x(\overline{C}_i^t, \overline{C}_*^s(\overline{C}_i^t))-\max_{\{\overline{C}_j^s \neq \overline{C}_*^s(\overline{C}_i^t)\}} \text{sim}^x(\overline{C}_i^t, \overline{C}_j^s).$$

In step 455, the CGC process calculates and stores the target-side matchability, denoted as $\text{Mab}(\overline{C}^t | \overline{C}^s)$, from respective results of step 450 for each target centroid $\overline{C}_i^t$, i=1 . . . k, by averaging the respective matchability of all target centroids $\overline{C}^t$ to all source centroids $\overline{C}^s$:

$$\text{Mab}(\overline{C}^t \mid \overline{C}^s) = \sum_{\overline{C}_i^t} \text{Mab}(\overline{C}_i^t \mid \overline{C}^s)/|C^t|$$

After storing the target-side matchability of all target centroids to all source centroids in step 455, the CGC process proceeds with step 460 of FIG. 4A, supra. See FIG. 5B, infra, for an example of ambiguous matches caused by adverse target-side matchability.

Figure 4D:
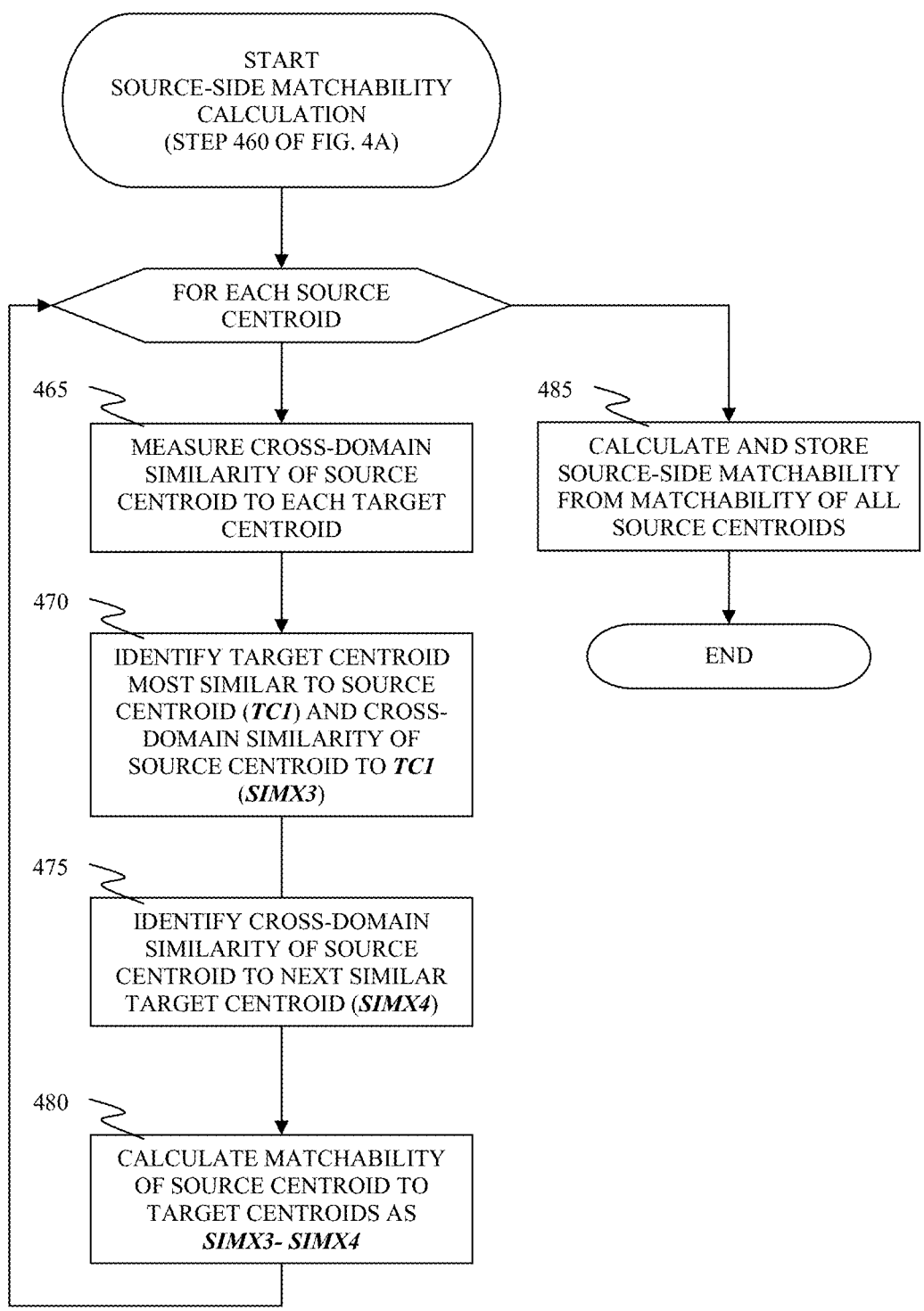
FIG. 4D is a flowchart depicting a method for calculating source-side matchability of the source domain data set, step 460 of FIG. 4A, in accordance with the embodiments of the present invention.

FIG. 4D is a flowchart depicting a method for calculating source-side matchability of the source domain data set, step 460 of FIG. 4A, supra, in accordance with the embodiments of the present invention.

Steps 465 and 480 are performed for each source centroid $\overline{C}_j^s$, j=1 . . . k of the source domain. After respective source matchabilities of all source centroids are calculated, the CGC process proceeds with step 485.

In step 465, the CGC process measures cross-domain similarity of a current source centroid $\overline{C}_j^s$ to each target centroid of the target domain, denoted as $\text{sim}^x(\overline{C}_j^s, \overline{C}_i^t)$. Then the CGC process proceeds with step 470.

In step 470, the CGC process identifies a first target centroid that is most similar to the current source centroid $\overline{C}_j^s$, denoted as $\overline{C}_*^t(\overline{C}_j^s)$, and a first cross-domain similarity of the current source centroid to the first target centroid, denoted as $\text{sim}^x(\overline{C}_j^s, \overline{C}_*^t(\overline{C}_j^s))$. Then the CGC process proceeds with step 475.

In step 475, the CGC process identifies a second cross-domain similarity of the current source centroid $\overline{C}_j^s$ to a second target centroid that is most similar to the current source centroid $\overline{C}_j^s$ next to the first target centroid, denoted as $\max_{\{\overline{C}_i^t \neq \overline{C}_*^t(\overline{C}_j^s)\}} \text{sim}^x(\overline{C}_j^s, \overline{C}_i^t)$. Then the CGC process proceeds with step 480.

In step 480, the CGC process calculates matchability of the current source centroid $\overline{C}_j^s$ to all target centroids $\overline{C}^t$, denoted as $\text{Mab}(\overline{C}_j^s | \overline{C}^t)$, by subtracting the second cross-domain similarity of the current source centroid $\overline{C}_j^s$ in step 475 from the first cross-domain similarity of the current source centroid $\overline{C}_j^s$ in step 470:

$$\text{Mab}(\overline{C}_j^s|\overline{C}^t)=\text{sim}^x(\overline{C}_j^s, \overline{C}_*^t(\overline{C}_j^s))-\max_{\{\overline{C}_i^t \neq \overline{C}_*^t(\overline{C}_j^s)\}} \text{sim}^x(\overline{C}_j^s, \overline{C}_i^t).$$

In step 485, the CGC process calculates and stores the source-side matchability, denoted as $\text{Mab}(\overline{C}_j^s | \overline{C}^t)$, from respective results of step 480 for each source centroid $\overline{C}_j^s$, i=1 . . . k, by averaging the respective matchability of all source centroids $\overline{C}^s$ to all target centroids $\overline{C}^t$:

$$\text{Mab}(\overline{C}^s \mid \overline{C}^t) = \sum_{\overline{C}_j^s} \text{Mab}(\overline{C}_j^s \mid \overline{C}^t)/|C^s|$$

Figure 5A:
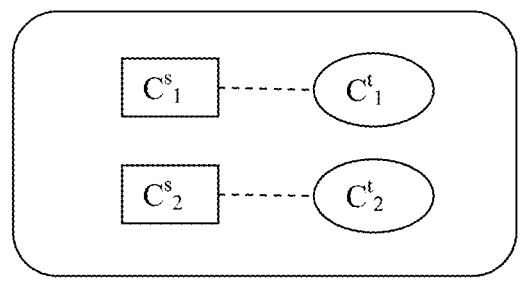
FIGS. 5A, 5B, and 5C illustrate examples of mappings between source centroids and target centroids, in accordance with the embodiments of the present invention.
Figure 5B:
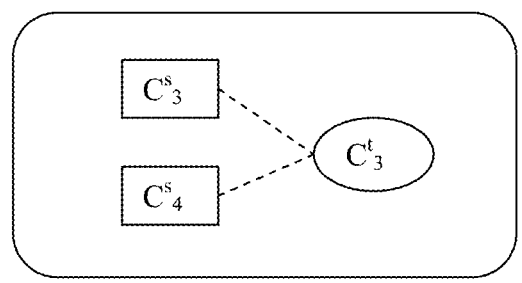
Figure 5C:
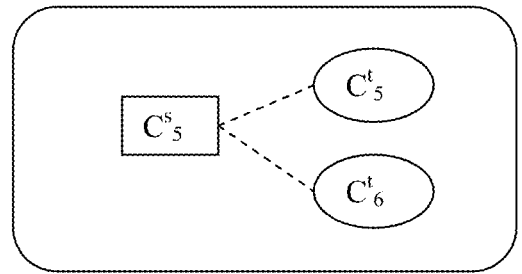

After storing the source-side matchability of all source centroids to all target centroids in step 485, the CGC process proceeds with step 490 of FIG. 4A, supra. See FIG. 5C, infra, for an example of ambiguous matches caused by adverse source-side matchability. FIGS. 5A, 5B, and 5C illustrate examples of mappings between source centroids and target centroids, in accordance with the embodiments of the present invention.

FIG. 5A illustrates a first mapping between source centroids and target centroids, in which the source centroids provide a supervision favorable for cross-guided target clustering, in accordance with the embodiments of the present invention.

A first target centroid $C_1^t$ is matched unambiguously to a first source centroid $C_1^s$. Similarly, a second target centroid $C_2^t$ is matched unambiguously to a second source centroid $C_2^s$. Because each source centroid provides supervision for a respectively corresponding target centroid only and does not influence other target centroid, clustering of source data set is appropriate for cross-guided clustering of target data set. See FIGS. 2B and 2C, supra, for examples of data sets that are favorable for cross-guided clustering.

FIG. 5B illustrates a second mapping between source centroids and target centroids, in which the source centroids do not provide a supervision favorable for cross-guided target clustering due to target-side ambiguity, in accordance with the embodiments of the present invention.

A third target centroid $C_3^t$ is matched to both a third source centroid $C_3^s$ and a fourth source centroid $C_4^s$, because the third target centroid $C_3^t$ is similar to both source centroids. if the third target centroid $C_3^t$ is a true centroid of multiple target data items, the target data items may not converge to a same target cluster as guided by separate source centroids, and such clustering adversely affects the target-side matchability described in FIG. 4C, supra.

FIG. 5C illustrates a third mapping between source centroids and target centroids, in which the source centroids do not provide a supervision favorable for cross-guided target clustering due to source-side ambiguity, in accordance with the embodiments of the present invention.

A fifth source centroid $C_5^s$ is matched to both a fifth target centroid $C_5^t$ and a sixth target centroid $C_6^t$, because the fifth source centroid $C_5^s$ is similar to both target centroids. Target data items of the fifth target centroid $C_5^t$ and the sixth target centroid $C_6^t$ will be clustered in a same target cluster as guided by the fifth source centroid $C_5^s$, and such clustering adversely affects the source-side matchability described in. FIG. 4D, supra.

Figure 6:
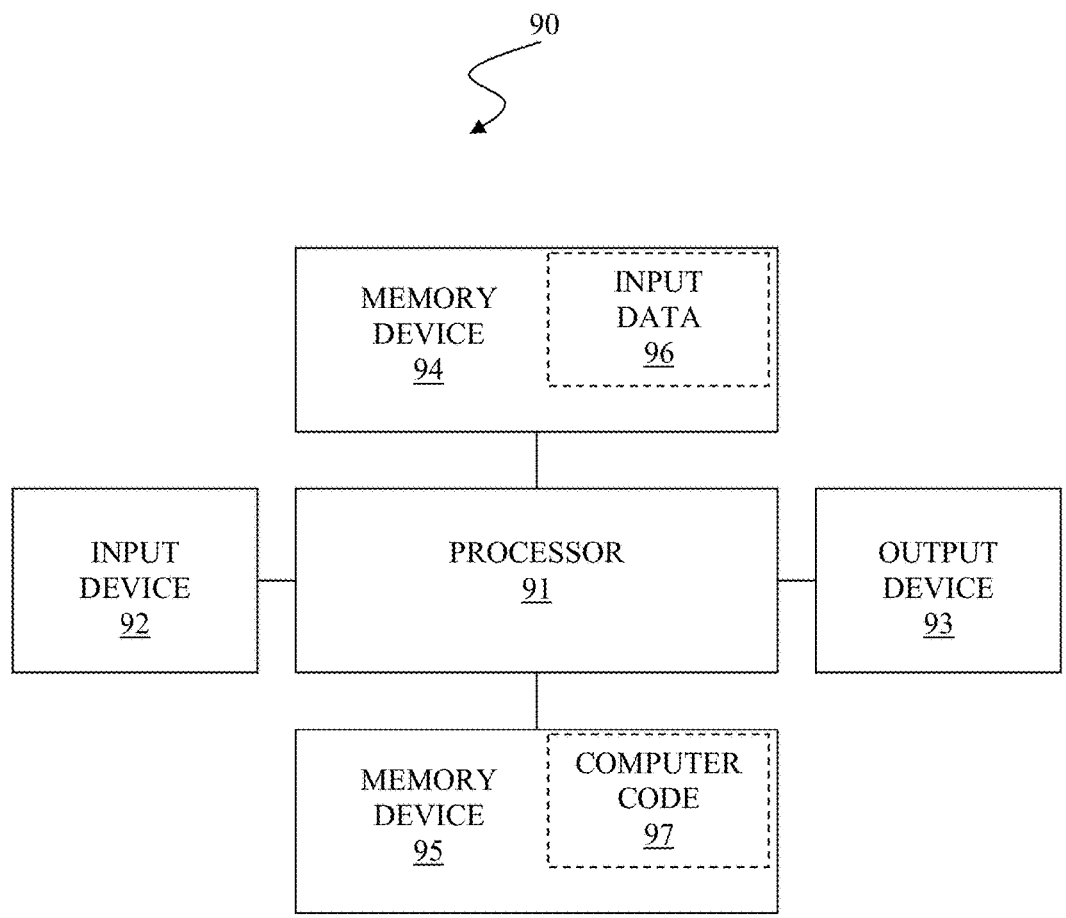
FIG. 6 illustrates a computer system used for cross-guided clustering based on alignment between data domains, in accordance with the embodiments of the present invention.

FIG. 6 illustrates a computer system 90 used for cross-guided clustering based on alignment between data domains, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter cilia, a keyboard, a mouse, a keypad, a touch screen, a voice recognition device, a sensor, a network interface card (NIC), a Voice/video over Internet Protocol (VOW) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOW adapter, a wireless adapter, a telephone adapter, a dedicated circuit adapter, an audio and/or visual signal generator, a light emitting diode (LED), etc. The memory devices 94 and 95 may be, inter alfa, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter cilia, an algorithm used for cross-guided clustering based on alignment between data domains according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention can be deployed, managed, serviced, etc. by a service provider that offers to deploy or integrate computing infrastructure with respect to a process for cross-guided clustering based on alignment between data domains of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for cross-guided clustering based on alignment between data domains.

In another embodiment, the invention provides a business method that performs the process steps of the invention on a subscription, advertising and/or fee basis. That is, a service provider, such as a Solution Integrator, can offer to create, maintain, support, etc. a process for cross-guided clustering based on alignment between data domains of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with a system, apparatus, or device that executes instructions.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) arid computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, run substantially concurrently, or the blocks may sometimes run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, said method comprising:

creating, by a processor of a computer system, a cross-domain similarity graph over source centroids of a source domain and the target centroids of a target domain, using projected weights of pivot words in the source domain and the target domain, said cross-domain similarity graph comprising a first set of vertices corresponding to the source centroids and a second set of vertices corresponding to the target centroids, wherein a weight is assigned to each edge between one of the vertices in the first set vertices corresponding to the source centroids and one of the vertices in the second set vertices corresponding to the target centroids;

said processor finding an alignment between the source centroids and the target centroids over the cross-domain similarity graph, said finding the alignment comprising determining a subset of the edges having a maximum sum of the weights as compared with a sum of the weights for all other subsets of the edges, subject to each vertex connected by the edges in the subset being spanned by at most one edge in the subset;

said processor calculating target clusterability as an average of a respective clusterabillity of at least one target data item comprised by the target domain;

said processor calculating target-side matchability as an average of a respective matchability of each target centroid of the target domain to source centroids of the source domain, wherein the source domain comprises at least one source data item;

said processor calculating source-side matchability as an average of a respective matchability of each source centroid of said source centroids to the target centroids;

said processor calculating source-target pair matchability as an average of the target-side matchability and the source-side matchability; and said processor calculating cross-domain clusterability between the target domain and the source domain as a linear combination of the calculated target clusterability and the calculated source-target pair matchability, said cross-domain clusterability providing an improved clustering over conventional data clustering due to the alignment between the source centroids and the target centroids; and said processor transferring the calculated cross-domain clusterability to a first device selected from the group consisting of an output device of a computer system, a storage device of the computer system, a remote computer system coupled to the computer system, and a combination thereof.

2. The method of claim 1, wherein the target clusterability $Cab(T|\overline{C}^t)$ is $Cab(T|\overline{C}^t) = \Sigma_{\{t_i \in T\}} Cab(t_i|\overline{C}^t)/|T|$, wherein the respective clusterability $Cab(t_i|\overline{C}^t)$ of an i-th target data item $t_i$ of said at least one target data item of the target domain T is $Cab(t_i|\overline{C}^t) = sim(t_i, \overline{C}_*^t(t_i)) - max_{\{\overline{C}_j^t \neq \overline{C}_*^t(t_i)\}} sim(t_i, \overline{C}_j^t)$, for integer i being greater than or equal to 1 and smaller than or equal to k, wherein a first term $sim(t_i, \overline{C}_j^t)$ is a respective similarity of the i-th target data item $t_i$ to a respective t target centroid of the i-th target data item $t_i$, denoted as $\overline{C}_*^t(t_i)$, and wherein a second term $max_{\{\overline{C}_j^t \neq \overline{C}_*^t(t_i)\}} sim(t_i, \overline{C}_j^t)$ is a largest value among all respective similarities of each target data item $t_i$ to a respective target centroid $\overline{C}_j^t$ that is not the respective true target centroid $\overline{C}_*^t(t_i)$.

3. The method of claim 2, wherein the target-side matchability $\text{Mab}(\overline{C}^t|\overline{C}^s)$ is $\text{Mab}(\overline{C}^t|\overline{C}^s)=\Sigma_{\overline{C}_i^t}\text{Mab}(\overline{C}_i^t|\overline{C}^s)/|C^t|$, wherein the respective matchability $\text{Mab}(\overline{C}_i^t|\overline{C}^s)$ of an i-th target centroid $\overline{C}_i^t$ of the target domain to the source centroids $\overline{C}^s$ is $\text{Mab}(\overline{C}_i^t|\overline{C}^s)=\text{sim}^x(\overline{C}_i^t, \overline{C}_*^s(\overline{C}_i^t))-\max_{\{\overline{C}_j^s \neq \overline{C}_*^s(\overline{C}_i^t)\}}\text{sim}^x(\overline{C}_i^t, \overline{C}_j^s)$, for integer i being greater than or equal to 1 and smaller than or equal to k, wherein a first term $\text{sim}^x(\overline{C}_i^t, \overline{C}_*^s(\overline{C}_i^t))$ is a first cross-domain similarity between the i-th target centroid $\overline{C}_i^t$ and a nearest source centroid $\overline{C}_*^s(\overline{C}_i^t)$, the first term being the largest value among all similarity values between the i-th target centroid $\overline{C}_i^t$ and the source centroids $\overline{C}^s$, and wherein a second term $\max_{\{\overline{C}_j^s \neq \overline{C}_*^s(\overline{C}_i^t)\}}\text{sim}^x(\overline{C}_i^t, \overline{C}_j^s)$ is a largest value among all cross-domain similarities between the i-th target centroid $\overline{C}_i^t$ and a respective source centroid $\overline{C}_j^s$ that is not the nearest source centroid $\overline{C}_*^s(\overline{C}_i^t)$.

4. The method of claim 2, wherein the source-side matchability $\text{Mab}(\overline{C}^s|\overline{C}^t)$ is $\text{Mab}(\overline{C}^s|\overline{C}^t)=\Sigma_{\overline{C}_j^s}\text{Mab}(\overline{C}_j^s|\overline{C}^t)/|C^s|$, wherein the respective matchability $\text{Mab}(\overline{C}_j^s|\overline{C}^t)$ of a j-th source centroid $\overline{C}_j^s$ the source domain to the target centroids $\overline{C}^t$ is $\text{Mab}(\overline{C}_j^s|\overline{C}^t)=\text{sim}^x(\overline{C}_j^s, \overline{C}_*^t(\overline{C}_j^s))-\max_{\{\overline{C}_i^t \neq \overline{C}_*^t(\overline{C}_j^s)\}}\text{sim}^x(\overline{C}_j^s, \overline{C}_i^t)$, for integer i being greater than or equal to 1 and smaller than or equal to k, wherein a first term $\text{sim}^x(\overline{C}_j^s, \overline{C}_*^t(\overline{C}_j^s))$ is a first cross-domain similarity between the j-th source centroid $\overline{C}_j^s$ and a nearest target centroid $\overline{C}_*^t(\overline{C}_j^s)$, the first term being the largest value among all similarity values between the j-th source centroid $\overline{C}_j^s$ and the target centroids $\overline{C}^t$, and wherein a second term $\max_{\{\overline{C}_i^t \neq \overline{C}_*^t(\overline{C}_j^s)\}}\text{sim}^x(\overline{C}_j^s, \overline{C}_i^t)$ is a largest value among all cross-domain similarities between the j-th source centroid $\overline{C}_j^s$ and a respective target centroid $\overline{C}_i^t$ that is not the nearest target centroid $\overline{C}_*^t(\overline{C}_j^s)$.

5. The method of claim 2, wherein the cross-domain clusterability $\text{Cab}(T|C^s, C^t)$ between the target domain T and the source domain is $\text{Cab}(T|C^s, C^t)=a\text{Cab}(T|C^t)+(1-a)\text{Mab}(C^s, C^t)$, wherein the calculated target clusterability $\text{Cab}(T|C^t)$ has a value from a first range of $[-1.0, +1.0]$, wherein the calculated source-target pair matchability $\text{Mab}(C^s, C^t)$ has a value from a second range of $[0.0, 1.0]$, and wherein the trade-off parameter a has a value from a third range of $[0.0, 1.0]$.

6. A computer program product, comprising a computer readable hardware memory having a computer readable program code embodied therein, said computer readable program code containing instructions that perform a method, said method comprising:

creating, by a processor of a computer system, a cross-domain similarity graph over source centroids of a source domain and the target centroids of a target domain, using projected weights of pivot words in the source domain and the target domain, said cross-domain similarity graph comprising a first set of vertices corresponding to the source centroids and a second set of vertices corresponding to the target centroids, wherein a weight is assigned to each edge between one of the vertices in the first set vertices corresponding to the source centroids and one of the vertices in the second set vertices corresponding to the target centroids;

said processor finding an alignment between the source centroids and the target centroids over the cross-domain similarity graph, said finding the alignment comprising determining a subset of the edges having a maximum sum of the weights as compared with a sum of the weights for all other subsets of the edges. subject to each vertex connected by the edges in the subset being spanned by at most one edge in the subset;

said processor calculating target clusterability as an average of a respective clusterability of at least one target data item comprised by the target domain;

said processor calculating target-side matchability as an average of a respective matchability of each target centroid of the target domain to source centroids of the source domain, wherein the source domain comprises at least one source data item;

said processor calculating source-side matchability as an average of a respective matchability of each source centroid of said source centroids to the target centroids;

said processor calculating source-target pair matchability as an average of the target-side matchability and the source-side matchability;

said processor calculating cross-domain clusterability between the target domain and the source domain as a linear combination of the calculated target clusterability and the calculated source-target pair matchability, said cross-domain clusterability providing an improved clustering over conventional data clustering due to the alignment between the source centroids and the target centroids; and said processor transferring the calculated cross-domain clusterability to a first device selected from the group consisting of an output device of a computer system, a storage device of the computer system, a remote computersystem coupled to the computer system, and a combination thereof.

7. The computer program product of claim 6, wherein the target clusterability $\text{Cab}(T|\overline{C}^t)$ is $\text{Cab}(T|\overline{C}^t)=\Sigma_{\{t_i \in T\}}\text{Cab}(t_i|\overline{C}^t)/|T|$, wherein the respective clusterability $\text{Cab}(t_i|\overline{C}^t)$ of an i-th target data item $t_i$ of said at least one target data item of the target domain T is $\text{Cab}(t_i|\overline{C}^t)=\text{sim}(t_i, \overline{C}_*^t, (t_i))-\max_{\{\overline{C}_j^t \neq \overline{C}_*^t(t_i)\}}\text{sim}(t_i, \overline{C}_j^t)$, for integer i being greater than or equal to 1 and smaller than or equal to k, wherein a first term $\text{sim}(t_i, \overline{C}_j^t)$ is a respective similarity of the i-th target data item $t_i$ to a respective t target centroid of the i-th target data item $t_i$, denoted as $\overline{C}_*^t(t_i)$, and wherein a second term $\max_{\{\overline{C}_j^t \neq \overline{C}_*^t(t_i)\}}\text{sim}(t_i, \overline{C}_j^t)$ is a largest value among all respective similarities of each target data item $t_i$ to a respective target centroid $\overline{C}_j^t$ that is not the respective true target centroid $\overline{C}_*^t(t_i)$.

8. The computer program product of claim 7, wherein the target-side matchability $\text{Mab}(\overline{C}^t|\overline{C}^s)$ is $\text{Mab}(\overline{C}^t|\overline{C}^s)=\Sigma_{\overline{C}_i^t}\text{Mab}(\overline{C}_i^t|\overline{C}^s)/|C^t|$, wherein the respective matchability $\text{Mab}(\overline{C}_i^t|\overline{C}^s)$ of an i-th target centroid $\overline{C}_i^t$ of the target domain to the source centroids $\overline{C}^s$ is $\text{Mab}(\overline{C}_i^t|\overline{C}^s)=\text{sim}^x(\overline{C}_i^t, \overline{C}_*^s(\overline{C}_i^t))-\max_{\{\overline{C}_j^s \neq \overline{C}_*^s(\overline{C}_i^t)\}}\text{sim}^x(\overline{C}_i^t, \overline{C}_j^s)$, for integer i being greater than or equal to 1 and smaller than or equal to k, wherein a first term $\text{sim}^x(\overline{C}_i^t, \overline{C}_*^s(\overline{C}_i^t))$ is a first cross-domain similarity between the i-th target centroid $\overline{C}_i^t$ and a nearest source centroid $\overline{C}_*^s(\overline{C}_i^t)$, the first term being the largest value among all similarity values between the i-th target centroid $\overline{C}_i^t$ and the source centroids $\overline{C}^s$, and wherein a second term $\max_{\{\overline{C}_j^s \neq \overline{C}_*^s(\overline{C}_i^t)\}}\text{sim}^x(\overline{C}_i^t, \overline{C}_j^s)$ is a largest value among all cross-domain similarities between the i-th target centroid $\overline{C}_i^t$ and a respective source centroid $\overline{C}_j^s$ that is not the nearest source centroid $\overline{C}_*^s(\overline{C}_i^t)$.

9. The computer program product of claim 7, wherein the source-side matchability $\text{Mab}(\overline{C}^s|\overline{C}^t)$ is $\text{Mab}(\overline{C}^s|\overline{C}^t)=\Sigma_{\overline{C}_j^s}\text{Mab}(\overline{C}_j^s|\overline{C}^t)/|C^s|$, wherein the respective matchability $\text{Mab}(\overline{C}_j^s|\overline{C}^t)$ of a j-th source centroid $\overline{C}_j^s$ the source domain to the target centroids $\overline{C}^t$ is $\text{Mab}(\overline{C}_j^s|\overline{C}^t)=\text{sim}^x(\overline{C}_j^s, C_*^t(\overline{C}_j^s))-\max_{\{\overline{C}_i^t \neq \overline{C}_*^t(\overline{C}_j^s)\}}\text{sim}^x(\overline{C}_j^s, \overline{C}_i^t)$, for integer i being greater than or equal to 1 and smaller than or equal to k, wherein a first term $\text{sim}^x(\overline{C}_j^s, \overline{C}_*^t(\overline{C}_j^s))$ is a first cross-domain similarity between the j-th source centroid $\overline{C}_j^s$ and a nearest target centroid $\overline{C}_*^t(\overline{C}_j^s)$, the first term being the largest value among all similarity values between the j-th source centroid $\overline{C}_j^s$ and the target centroids $\overline{C}^t$, and wherein a second term $\max_{\{\overline{C}_i^t \neq \overline{C}_*^t(\overline{C}_j^s)\}} \text{sim}^x(\overline{C}_j^s, \overline{C}_i^t)$ is a largest value among all cross-domain similarities between the j-th source centroid $\overline{C}_j^s$ and a respective target centroid $\overline{C}_i^t$ that is not the nearest target centroid $\overline{C}_*^t(\overline{C}_j^s)$.

10. The computer program product of claim 7, wherein the cross-domain clusterability $\text{Cab}(T|C^s, C^t)$ between the target domain T and the source domain is $\text{Cab}(T|C^s, C^t) = a\text{Cab}(T|C^t) + (1-a)\text{Mab}(C^s, C^t)$, wherein the calculated target clusterability $\text{Cab}(T|C^t)$ has a value from a first range of $[-1.0, +1.0]$, wherein the calculated source-target pair matchability $\text{Mab}(C^s, C^t)$ has a value from a second range of $[0.0, 1.0]$, and wherein the trade-off parameter a has a value from a third range of $[0.0, 1.0]$.

11. A computer system comprising a processor and a computer readable memory unit coupled to the processor, said computer readable memory unit containing instructions that when run by the processor implement a method, said method comprising:

said processor creating a cross-domain similarity graph over source centroids of a source domain and the target centroids of a target domain, using projected weights of pivot words in the source domain and the target domain, said cross-domain similarity graph comprising a first set of vertices corresponding to the source centroids and a second set of vertices corresponding to the target centroids, wherein a weight is assigned to each edge between one of the vertices in the first set vertices corresponding to the source centroids and one of the vertices in the second set vertices corresponding to the target centroids;

said processor finding an alignment between the source centroids and the target centroids over the cross-domain similarity graph, said finding the alignment comprising determining a subset of the edges having a maximum sum of the weights as compared with a sum of the weights for all other subsets of the edges, subject to each vertex connected by the edges in the subset being spanned by at most one edge in the subset;

said processor calculating target clusterability as an average of a respective clusterability of at least one target data item comprised by the target domain;

said processor calculating target-side matchability as an average of a respective matchability of each target centroid of the target domain to source centroids of the source domain, wherein the source domain comprises at least one source data item;

said processor calculating source-side matchabillity as an average of a respective matchability of each source centroid of said source centroids to the target centroids;

said processor calculating source-target pair matchability as an average of the target-side matchability and the source-side matchability;

said processor calculating cross-domain clusterability between the target domain and the source domain as a linear combination of the calculated target clusterability and the calculated source-target pair matchability, said cross-domain clusterability providing an improved clustering over conventional data clustering due to the alignment between the source centroids and the target centroids; and said processor ansferring the calculated cross-domain clusterability to a first device selected from the group consisting of an output device of a computer system, a storage device of the computer system, a remote computer system coupled to the computer system, and a combination thereof.

12. The computer system of claim 11, wherein the target clusterability $\text{Cab}(T|\overline{C}^t)$ is $\text{Cab}(T|\overline{C}^t) = \Sigma_{\{t_i \in T\}} \text{Cab}(t_i|\overline{C}^t)/|T|$, wherein the respective clusterability $\text{Cab}(t_i|\overline{C}^t)$ of an i-th target data item $t_i$ of said at least one target data item of the target domain T is $\text{Cab}(t_i|\overline{C}^t) = \text{sim}(t_i, \overline{C}_*^t(t_i)) - \max_{\{\overline{C}_j^t \neq \overline{C}_*^t(t_i)\}} \text{sim}(t_i, \overline{C}_j^t)$, for integer i being greater than or equal to 1 and smaller than or equal to k, wherein a first term $\text{sim}(t_i, \overline{C}_j^t)$ is a respective similarity of the i-th target data item $t_i$ to a respective t target centroid of the i-th target data item $t_i$, denoted as $\overline{C}_*^t(t_i)$, and wherein a second term $\max_{\{\overline{C}_j^t \neq \overline{C}_*^t(t_i)\}} \text{sim}(t_i, \overline{C}_j^t)$ is a largest value among all respective similarities of each target data item $t_i$ to a respective target centroid $\overline{C}_j^t$ that is not the respective true target centroid $\overline{C}_*^t(t_i)$.

13. The computer system of claim 12, wherein the target-side matchability $\text{Mab}(\overline{C}^t|\overline{C}^s)$ is $\text{Mab}(\overline{C}^t|\overline{C}^s) = \Sigma_{\overline{C}_i^t} \text{Mab}(\overline{C}_i^t|\overline{C}^s)/|C^t|$, wherein the respective matchability $\text{Mab}(\overline{C}_i^t|\overline{C}^s)$ of an i-th target centroid $\overline{C}_i^t$ of the target domain to the source centroids $\overline{C}^s$ is $\text{Mab}(\overline{C}_i^t|\overline{C}^s) = \text{sim}^x(\overline{C}_i^t, \overline{C}_*^s(\overline{C}_i^t)) - \max_{\{\overline{C}_j^s \neq \overline{C}_*^s(\overline{C}_i^t)\}} \text{sim}^x(\overline{C}_i^t, \overline{C}_j^s)$, for integer i being greater than or equal to 1 and smaller than or equal to k, wherein a first term $\text{sim}^x(\overline{C}_i^t, \overline{C}_*^s(\overline{C}_i^t))$ is a first cross-domain similarity between the i-th target centroid $\overline{C}_i^t$ and a nearest source centroid $\overline{C}_*^s(\overline{C}_i^t)$, the first term being the largest value among all similarity values between the i-th target centroid $\overline{C}_i^t$ and the source centroids $\overline{C}^s$, and wherein a second term $\max_{\{\overline{C}_j^s \neq \overline{C}_*^s(\overline{C}_i^t)\}} \text{sim}^x(\overline{C}_i^t, \overline{C}_j^s)$ is a largest value among all cross-domain similarities between the i-th target centroid $\overline{C}_i^t$ and a respective source centroid $\overline{C}_j^s$ that is not the nearest source centroid $\overline{C}_*^s(\overline{C}_i^t)$.

14. The computer system of claim 12, wherein the source-side matchability $\text{Mab}(\overline{C}^s|\overline{C}^t)$ is $\text{Mab}(\overline{C}^s|\overline{C}^t) = \Sigma_{\overline{C}_j^s} \text{Mab}(\overline{C}_j^s|\overline{C}^t)/|C^s|$, wherein the respective matchability $\text{Mab}(\overline{C}_j^s|\overline{C}^t)$ of a j-th source centroid $\overline{C}_j^s$ of the source domain to the target centroids $\overline{C}^t$ is $\text{Mab}(\overline{C}_j^s|\overline{C}^t) = \text{sim}^x(\overline{C}_j^s, \overline{C}_*^t(\overline{C}_j^s)) - \max_{\{\overline{C}_i^t \neq \overline{C}_*^t(\overline{C}_j^s)\}} \text{sim}^x(\overline{C}_j^s, \overline{C}_i^t)$, for integer i being greater than or equal to 1 and smaller than or equal to k, wherein a first term $\text{sim}^x(\overline{C}_j^s, \overline{C}_*^t(\overline{C}_j^s))$ is a first cross-domain similarity between the j-th source centroid $\overline{C}_j^s$ and a nearest target centroid $\overline{C}_*^t(\overline{C}_j^s)$, the first term being the largest value among all similarity values between the j-th source centroid $\overline{C}_j^s$ and the target centroids $\overline{C}^t$, and wherein a second term $\max_{\{\overline{C}_i^t \neq \overline{C}_*^t(\overline{C}_j^s)\}} \text{sim}^x(\overline{C}_j^s, \overline{C}_i^t)$ is a largest value among all cross-domain similarities between the j-th source centroid $\overline{C}_j^s$ and a respective target centroid $\overline{C}_i^t$ that is not the nearest target centroid $\overline{C}_*^t(\overline{C}_j^s)$.

* * * * *